US009695574B2

(12) United States Patent
Miyamoto et al.

(10) Patent No.: US 9,695,574 B2
(45) Date of Patent: *Jul. 4, 2017

(54) WORK VEHICLE AND CONTROL METHOD FOR SAME

(71) Applicant: KOMATSU LTD., Tokyo (JP)

(72) Inventors: Shunsuke Miyamoto, Atsugi (JP); Takehiro Komatsu, Hiratsuka (JP); Yasuo Fujiwara, Hiratsuka (JP)

(73) Assignee: KOMATSU LTD., Tokyo (JP)

( * ) Notice: Subject to any disclaimer, the term of this patent is extended or adjusted under 35 U.S.C. 154(b) by 6 days.

This patent is subject to a terminal disclaimer.

(21) Appl. No.: 14/774,786

(22) PCT Filed: Nov. 12, 2014

(86) PCT No.: PCT/JP2014/079967
§ 371 (c)(1),
(2) Date: Sep. 11, 2015

(87) PCT Pub. No.: WO2015/072484
PCT Pub. Date: May 21, 2015

(65) Prior Publication Data
US 2016/0024754 A1   Jan. 28, 2016

(30) Foreign Application Priority Data
Nov. 15, 2013   (JP) .................................. 2013-237339

(51) Int. Cl.
*B60K 6/365* (2007.10)
*E02F 9/20* (2006.01)
(Continued)

(52) U.S. Cl.
CPC ............ *E02F 9/2079* (2013.01); *B60K 6/365* (2013.01); *B60K 6/445* (2013.01); *B60W 10/08* (2013.01);
(Continued)

(58) Field of Classification Search
CPC ...................................................... B60K 6/365
See application file for complete search history.

(56) References Cited

U.S. PATENT DOCUMENTS 5,168,946 A * 12/1992 Dorgan .................... B60K 1/02
                                                    180/6.44
5,671,137 A      9/1997 Ishino et al.
(Continued)

FOREIGN PATENT DOCUMENTS

| CN | 101346264 A | 1/2009 |
| CN | 101652521 A | 2/2010 |

(Continued)

OTHER PUBLICATIONS

The International Search Report for the corresponding international application No. PCT/JP2014/079967, issued on Jan. 27, 2015.
(Continued)

*Primary Examiner* — Tisha Lewis
(74) *Attorney, Agent, or Firm* — Global IP Counselors, LLP

(57) ABSTRACT

A work vehicle includes a control unit having a motor switch control unit and a motor command determining unit. The motor switch control unit controls a motor switching mechanism so that a third motor connects to a first motor when a first rotation speed is less than a second rotation speed. The first rotation speed is the rotation speed of the first motor corresponding to that of a rotating shaft of the third motor. The second rotation speed is the rotation speed of the second motor corresponding to that of a rotating shaft of the third motor. When the third motor is connected to the first motor, the motor command determining unit determines a command torque for the first motor and the third motor so that the command torque for the third motor is no more than the command torque for the first motor.

16 Claims, 17 Drawing Sheets

(51) Int. Cl.
 *B60K 6/445* (2007.10)
 *B60W 10/10* (2012.01)
 *B60W 10/26* (2006.01)
 *B60W 20/00* (2016.01)
 *B60W 10/08* (2006.01)
 *B60W 20/10* (2016.01)
 *E02F 3/34* (2006.01)
 *E02F 3/42* (2006.01)

(52) U.S. Cl.
 CPC ............ *B60W 10/10* (2013.01); *B60W 10/26* (2013.01); *B60W 20/00* (2013.01); *B60W 20/10* (2013.01); *E02F 3/34* (2013.01); *E02F 3/422* (2013.01); *E02F 9/2075* (2013.01); *Y10S 903/902* (2013.01)

(56) References Cited

U.S. PATENT DOCUMENTS

| | | | |
|---|---|---|---|
| 6,582,340 B1 | 6/2003 | Arie et al. | |
| 7,717,816 B2 * | 5/2010 | Hiraki | B60K 6/365 475/5 |
| 2009/0105028 A1 | 4/2009 | Hiraki et al. | |
| 2016/0237651 A1 * | 8/2016 | Miyamoto | F16H 3/728 |
| 2016/0298315 A1 * | 10/2016 | Miyamoto | B60K 6/36 |

FOREIGN PATENT DOCUMENTS

| | | |
|---|---|---|
| EP | 0385393 B1 | 12/1993 |
| JP | 2006-329244 A | 12/2006 |
| JP | 2007-230366 A | 9/2007 |
| JP | 2009-286187 A | 12/2009 |
| JP | 2010-159036 A | 7/2010 |
| JP | 2010-188775 A | 9/2010 |

OTHER PUBLICATIONS

The extended European search report for the corresponding European application No. 14861730.1, dated Sep. 14, 2016.

The Office Action for the corresponding Chinese application No. 201480020626.7, dated Aug. 2, 2016.

* cited by examiner

WORK VEHICLE AND CONTROL METHOD FOR SAME

CROSS-REFERENCE TO RELATED APPLICATIONS

This application is a U.S. National stage application of International Application No. PCT/JP2014/079967, filed on Nov. 12, 2014. This U.S. National stage application claims priority under 35 U.S.C. §119(a) to Japanese Patent Application No. 2013-237339, filed in Japan on Nov. 15, 2013, the entire contents of which are hereby incorporated herein by reference.

BACKGROUND

Field of the Invention

The present invention relates to a work vehicle, in particular, a hybrid-type work vehicle, and to a method for controlling the same.

Recently, a hybrid-type work vehicle has been proposed that travels using driving power from an engine and driving power from a motor. A hydraulic-mechanical transmission (HMT) or an electric-mechanical transmission (EMT) are disclosed as power transmission devices for hybrid-type work vehicles as in, for example, Japanese Unexamined Patent Application Publication No. 2006-329244.

The HMT has a planetary gear mechanism, and a first pump/motor and a second pump/motor connected to rotating elements of the planetary gear mechanism. The first pump/motor and the second pump/motor function as either hydraulic motors or hydraulic pumps in response to the travel state of the work vehicle. The HMT is configured to enable stepless changing of the rotation speed of the output shaft by changing the rotation speed of the pump/motors. The HMT has a third pump/motor. The third pump/motor is provided to assist either the first pump/motor or the second pump/motor. The pump/motors assisted by the third pump/motor are switched in response to a speed range of the vehicle speed.

An electric motor is used in the EMT in place of the hydraulic motor in the HMT. That is, the EMT has a first generator/motor, a second generator/motor, and a third generator/motor. The first and second generator/motors function as either electric motors or electric generators in response to the travel state of the work vehicle. The third generator/motor is provided to assist either the first generator/motor or the second generator/motor. Similar to the HMT, the EMT is configured to enable stepless changing of the rotation speed of the output shaft by changing the rotation speed of the generator/motors.

SUMMARY

The maximum torque required for each motor may be reduced due to the first motor and the second motor being assisted by the third motor as in the above-mentioned HMT or the EMT. As a result, the size of the motors may be reduced. However, it is preferable to further reduce the size of the motors from the viewpoint of cost reductions or of reducing the weight of the power transmission device.

An object of the present invention is to provide a hybrid-type work vehicle that allows for a reduction in the size of the motors, and to provide a control method of the work vehicle.

A work vehicle according to a first embodiment of the present invention is equipped with an engine, a hydraulic pump, a work implement, a travel device, a power transmission device, and a control unit. The hydraulic pump is driven by the engine. The work implement is driven by hydraulic fluid discharged from the hydraulic pump. The travel device is driven by the engine. The power transmission device transmits driving power from the engine to the travel device. The control unit controls the power transmission device.

The power transmission device has an input shaft, an output shaft, a gear mechanism, a first motor, a second motor, a third motor, and a motor switching mechanism. The gear mechanism has a planetary gear mechanism and transmits the rotation of the input shaft to the output shaft. The first motor is connected to the first rotating elements of the planetary gear mechanism. The second motor is connected to the second rotating elements of the planetary gear mechanism. The third motor assists the first motor and the second motor. The motor switching mechanism is able to selectively connect the third motor to the first motor or the second motor. The power transmission device is configured to change the rotation speed ratio of the output shaft with respect to the input shaft by changing the rotation speeds of the first motor, the second motor and the third motor.

A control unit has a motor switch control unit and a motor command determining unit. The motor switch control unit controls a motor switching mechanism so that a third motor connects to a first motor when a first rotation speed is less than a second rotation speed. The first rotation speed is the rotation speed of the first motor corresponding to that of a rotating shaft of the third motor. The second rotation speed is the rotation speed of the second motor corresponding to that of a rotating shaft of the third motor. When the third motor is connected to the first motor, the motor command determining unit determines a command torque for the first motor and the third motor so that the command torque for the third motor is equal to or less than the command torque for the first motor.

In this case, when the first rotation speed of the first motor is less than the second rotation speed of the second motor, the third motor assists the first motor. That is, the third motor assists the first motor that requires a large torque because the motor with the lowest rotation speed requires a larger torque. As a result, the maximum torque required by the first motor can be reduced and thus the size of the first motor can be reduced. Moreover, a command torque to the third motor is determined as a value that is equal to or less than the command torque to the first motor. As a result, the size of the third motor can be reduced.

The motor switching mechanism preferably has a first clutch and a second clutch. The first clutch switches between connection and disconnection of the third motor with the first motor. The second clutch switches between connection and disconnection of the third motor with the second motor. The control unit further has a predicted speed computing unit. The predicted speed computing unit computes a first predicted rotation speed and a second predicted rotation speed. The first predicted rotation speed is a predicted value of the first rotation speed after a predetermined first predicted time period has elapsed from the current point in time. The second predicted rotation speed is a predicted value of the second rotation speed after the predetermined first predicted time period has elapsed from the current point in time. When the first predicted rotation speed decreases from a value larger than the second predicted rotation speed to the second predicted rotation speed, the motor switch control unit controls the motor switching mechanism to switch the connection target of the third motor from the second motor to the first motor.

In this case, the switching of the connection target of the third motor is determined with the first predicted rotation speed and the second predicted rotation speed. As a result, the connection target of the third motor can be switched from the second motor to the first motor at a timing when the first rotation speed of the first motor and the second rotation speed of the second motor approach each other in consideration of the time required for switching the first clutch and the second clutch. As a result, a shock caused by the switching can be reduced because fluctuation of the rotation speed of the third motor is suppressed.

The motor command determining unit preferably sets the command torque to the third motor MG3 to a predetermined standby command value in a period from point in time when the first predicted rotation speed reaches the second predicted rotation speed until a predetermined second predicted time period has elapsed. For example, the predetermined second predicted time period is a predicted time period for the completion of the connection of the first clutch. In this case, the command torque for the third motor becomes the predetermined standby command value until the connection of the first clutch and the second clutch is completed. As a result, loss of torque in the third motor can be reduced by setting the predetermined standby command value to zero or a small value. Further, shock from the switching can be reduced by preventing a sudden change in the rotation speed of the third motor during a switching operation.

When the third motor is connected to the first motor, the motor command determining unit preferably determines a command torque to the first motor and the third motor so that the command torque for the third motor is the same as the command torque for the first motor.

In this case, the output torque of the first motor can be reduced because the third motor outputs a torque of the same size as that of the first motor. As a result, wear on the components for transmitting the output torque of the first motor in the power transmission device can be suppressed.

The motor command determining unit preferably decides a required command torque to the first motor. When the third motor is connected to the first motor and the required torque is equal to or less than a predetermined boundary torque, the motor command determining unit determines the required torque as the command torque for the first motor and sets the command torque for the third motor to the predetermined standby command value. When the third motor is connected to the first motor and the required torque is greater than the predetermined boundary torque, the motor command determining unit determines the boundary torque as the command torque for the first motor and determines the command torque of the third motor from a difference between the required torque and the boundary torque.

In this case, the first motor can be assisted by the third motor when the required torque is greater than the predetermined boundary torque. When the required torque is equal to or less than the predetermined boundary torque, the generation of shock can be suppressed even when the connection with the third motor is switched because the command torque of the third motor is the predetermined standby command value.

The motor command determining unit preferably decides a required command torque to the first motor. When the third motor is connected to the first motor and the required torque is equal to or less than a predetermined torque threshold, the motor command determining unit determines the required torque as the command torque for the first motor and sets the command torque for the third motor to the predetermined standby command value. When the third motor is connected to the first motor, the required torque is greater than the predetermined torque threshold, and the command torque of the third motor is equal to or less than the toque threshold, the motor command determining unit determines the torque threshold as the command torque for the first motor and determines the command torque of the third motor from a difference between the required torque and the torque threshold. When the third motor is connected to the first motor, the required torque is greater than the predetermined torque threshold, and the command torque of the third motor is greater than the torque threshold, the command torques for the first motor and the third motor are determined so that the command torque of the first motor and the command torque of the third motor are the same.

In this case, when the required torque is equal to or less than the predetermined torque threshold, the generation of shock can be suppressed even when the connection with the third motor is switched because the command torque of the third motor is the predetermined standby command value. When the required torque is greater than the torque threshold and the command torque of the third motor is equal to or less than the torque threshold, the first motor can be assisted by the third motor. When the required torque is greater than the predetermined torque threshold and the command torque of the third motor is greater than the torque threshold, the torque assisted by the third motor increases because the third motor outputs a torque that is the same size as the first motor. As a result, the output torque of the first motor can be reduced and wear on the components for transmitting the output torque of the first motor in the power transmission device can be suppressed.

The motor switch control unit preferably controls the motor switching mechanism so that the third motor connects to the first motor when the second rotation speed is less than the first rotation speed. When the third motor is connected to the second motor, the motor command determining unit determines the command torques for the second motor and the third motor so that the command torque for the third motor is equal to or less than the command torque for the second motor.

In this case, when the second rotation speed of the second motor is less than the first rotation speed of the first motor, the third motor assists the second motor. That is, the third motor assists the second motor that requires a large torque because the motor with the lowest rotation speed requires a larger torque. As a result, the maximum torque required by the second motor can be reduced and thus the size of the second motor can be reduced. Moreover, a command torque to the third motor is determined as a value that is equal to or less than the command torque to the second motor. As a result, the size of the third motor can be reduced.

When the second predicted rotation speed decreases from a value larger than the first predicted rotation speed to the first predicted rotation speed, the motor switch control unit controls the motor switching mechanism to switch the connection target of the third motor from the first motor to the second motor.

In this case, the switching of the connection target of the third motor is determined with the first predicted rotation speed and the second predicted rotation speed. As a result, the connection target of the third motor can be switched from the first motor to the second motor at a timing when the second rotation speed of the second motor and the first rotation speed of the first motor approach each other in consideration of the time required for switching the first clutch and the second clutch.

The motor command determining unit preferably sets the command torque to the third motor to the predetermined standby command value in a period from point in time when the second predicted rotation speed reaches the first predicted rotation speed until a predetermined third predicted time period has elapsed. For example, the predetermined third predicted time period is a predicted time period for the completion of the connection of the second clutch. The third predicted time period may be a value that is the same as the second predicted time period, or may be a different value. In this case, the command torque for the third motor becomes the predetermined standby command value until the connection of the first clutch and the second clutch is completed. As a result, loss of torque in the third motor can be reduced by setting the predetermined standby command value to zero or a small value.

When the third motor is connected to the second motor, the motor command determining unit preferably determines the command torques to the second motor and the third motor so that the command torque for the third motor is the same as the command torque for the second motor.

In this case, the output torque of the second motor can be reduced because the third motor outputs a torque of the same size as that of the second motor. As a result, wear on the components for transmitting the output torque of the second motor in the power transmission device can be suppressed.

The motor command determining unit preferably decides a required torque to the second motor. When the third motor is connected to the second motor and the required torque is equal to or less than a predetermined boundary torque, the motor command determining unit determines the required torque as the command torque for the second motor and sets the command torque for the third motor to the predetermined standby command value. When the third motor is connected to the second motor and the required torque is greater than the predetermined boundary torque, the motor command determining unit determines the boundary torque as the command torque for the second motor and determines the command torque of the third motor from a difference between the required torque and the boundary torque.

In this case, the second motor can be assisted by the third motor when the required torque is greater than the predetermined boundary torque. When the required torque is equal to or less than the predetermined boundary torque, the generation of shock can be suppressed even if the connection with the third motor is switched because the command torque of the third motor is the predetermined standby command value.

The motor command determining unit preferably decides the required torque to the second motor. When the third motor is connected to the second motor and the required torque is equal to or less than a predetermined torque threshold, the motor command determining unit determines the required torque as the command torque for the second motor and sets the command torque for the third motor to the predetermined standby command value. When the third motor is connected to the second motor, the required torque is greater than the predetermined torque threshold, and the command torque of the third motor is equal to or less than the torque threshold, the motor command determining unit determines the torque threshold as the command torque for the second motor and determines the command torque of the third motor from a difference between the required torque and the torque threshold. When the third motor is connected to the second motor, the required torque is greater than the predetermined torque threshold, and the command torque of the third motor is greater than the torque threshold, the command torques for the second motor and the third motor are determined so that the command torque of the second motor and the command torque of the third motor are the same.

In this case, when the required torque is equal to or less than the predetermined torque threshold, the generation of shock can be suppressed even when the connection with the third motor is switched because the command torque of the third motor is the predetermined standby command value. When the required torque is greater than the predetermined torque threshold and the command torque of the third motor is equal to or less than the torque threshold, the second motor can be assisted by the third motor. When the required torque is greater than the predetermined torque threshold and the command torque of the third motor is greater than the torque threshold, the torque assisted by the third motor increases because the third motor outputs a torque that is the same size as that of the second motor. As a result, the output torque of the second motor can be reduced and wear on the components for transmitting the output torque of the second motor in the power transmission device can be suppressed.

The rotation speed of the first motor is preferably less than the first rotation speed. In this case, the sizes of the first motor and the third motor can be further reduced by increasing the speed of the third motor more than the first motor and connecting the first and third motors.

The rotation speed of the second motor is preferably less than the second rotation speed. In this case, the sizes of the second motor and the third motor can be further reduced by increasing the speed of the third motor more than the second motor and connecting the second and third motors.

A control method for a work vehicle according to another embodiment of the present invention is a control method for a work vehicle equipped with an engine, a hydraulic pump, a work implement, a travel device, and a power transmission device. The hydraulic pump is driven by the engine. The work implement is driven by hydraulic fluid discharged from the hydraulic pump. The travel device is driven by the engine. The power transmission device transmits driving power from the engine to the travel device.

The power transmission device has an input shaft, an output shaft, a gear mechanism, a first motor, a second motor, a third motor, and a motor switching mechanism. The gear mechanism has a planetary gear mechanism and transmits the rotation of the input shaft to the output shaft. The first motor is connected to the first rotating elements of the planetary gear mechanism. The second motor is connected to the second rotating elements of the planetary gear mechanism. The third motor assists the first motor and the second motor. The motor switching mechanism is able to selectively connect the third motor to the first motor or the second motor. The power transmission device is configured to change the rotation speed ratio of the output shaft with respect to the input shaft by changing the rotation speeds of the first motor, the second motor and the third motor.

The control method according to the present embodiment includes a first step and a second step. The motor switching mechanism is controlled in the first step so that the third motor connects to the first motor when the first rotation speed is less than the second rotation speed. The first rotation speed is the rotation speed of the first motor corresponding to that of a rotating shaft of the third motor. The second rotation speed is the rotation speed of the second motor corresponding to that of a rotating shaft of the third motor.

When the third motor is connected to the first motor, the command torques for the first motor and the third motor are determined in the second step so that the command torque for the third motor is equal to or less than the command torque for the first motor.

In this case, when the first rotation speed of the first motor is less than the second rotation speed of the second motor, the third motor assists the first motor. That is, the third motor assists the first motor that requires a large torque because the motor with the lowest rotation speed requires a larger torque. As a result, the maximum torque required by the first motor can be reduced and thus the size of the first motor can be reduced. Moreover, a command torque to the third motor is determined as a value that is equal to or less than the command torque to the first motor. As a result, the size of the third motor can be reduced.

According to exemplary embodiments of the present invention, a size of the motors in a hybrid-type work vehicle is reduced.

DETAILED DESCRIPTION OF EXEMPLARY EMBODIMENTS

Figure 1:
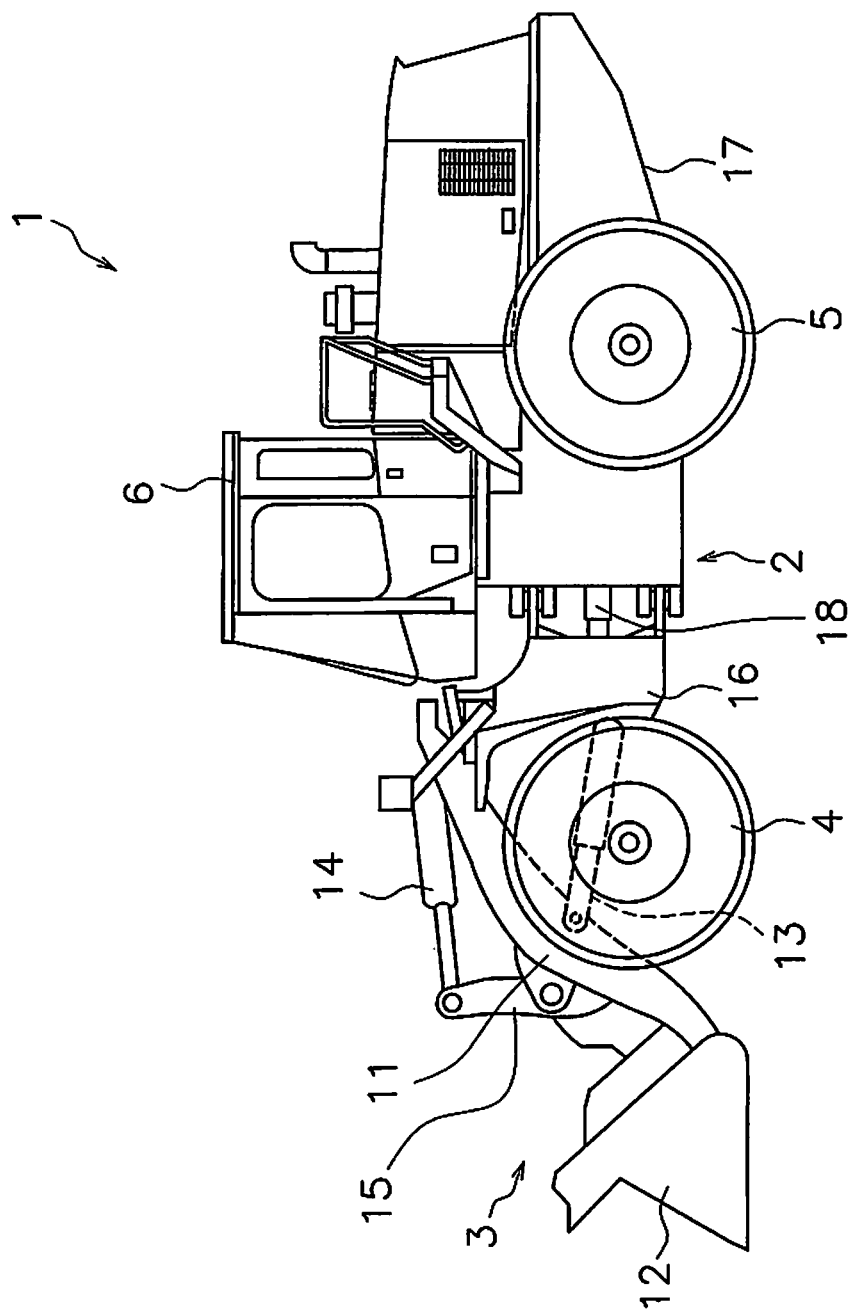
FIG. 1 is a side view of a work vehicle according to an embodiment of the present invention.

Exemplary embodiments of the present invention will be explained in detail with reference to the figures. FIG. 1 is a side view of a work vehicle 1 according to an exemplary embodiment of the present invention. As illustrated in FIG. 1, the work vehicle 1 is equipped with a vehicle body frame 2, a work implement 3, traveling wheels 4 and 5, and an operating cabin 6. The work vehicle 1 is a wheel loader and travels due to the traveling wheels 4 and 5 being rotated and driven. The work vehicle 1 is able to carry out work such as excavation by using the work implement 3.

The work implement 3 and the traveling wheels 4 and 5 are attached to the vehicle body frame 2. The work implement 3 is driven by hydraulic fluid from a below-mentioned work implement pump 23 (see FIG. 2). The work implement 3 has a boom 11 and a bucket 12. The boom 11 is mounted on the vehicle body frame 2. The work implement 3 includes a lift cylinder 13 and a bucket cylinder 14. The lift cylinder 13 and the bucket cylinder 14 are hydraulic cylinders. One end of the lift cylinder 13 is attached to the vehicle body frame 2. The other end of the lift cylinder 13 is attached to the boom 11. The boom 11 swings up and down due to the extension and contraction of the lift cylinder 13 due to hydraulic fluid from the work implement pump 23. The bucket 12 is attached to the tip of the boom 11. One end of the bucket cylinder 14 is attached to the vehicle body frame 2. The other end of the bucket cylinder 14 is attached to the bucket 12 via a bell crank 15. The bucket 12 swings up and down due to the extension and contraction of the bucket cylinder 14 due to hydraulic fluid from the work implement pump 23.

The operating cabin 6 is attached to the vehicle body frame 2. The operating cabin 6 is mounted on the vehicle body frame 2. A seat for the operator and a below-mentioned operating device are disposed in the operating cabin 6. The vehicle body frame 2 has a front frame 16 and a rear frame 17. The front frame 16 and the rear frame 17 are attached to each other in a manner that allows swinging in the left-right direction.

The work vehicle 1 has a steering cylinder 18. The steering cylinder 18 is attached to the front frame 16 and the rear frame 17. The steering cylinder 18 is a hydraulic cylinder. The work vehicle 1 is able to change the advancing direction to the right and left with the extension and contraction of the steering cylinder 18 due to hydraulic fluid from a below-mentioned steering pump 30.

Figure 2:
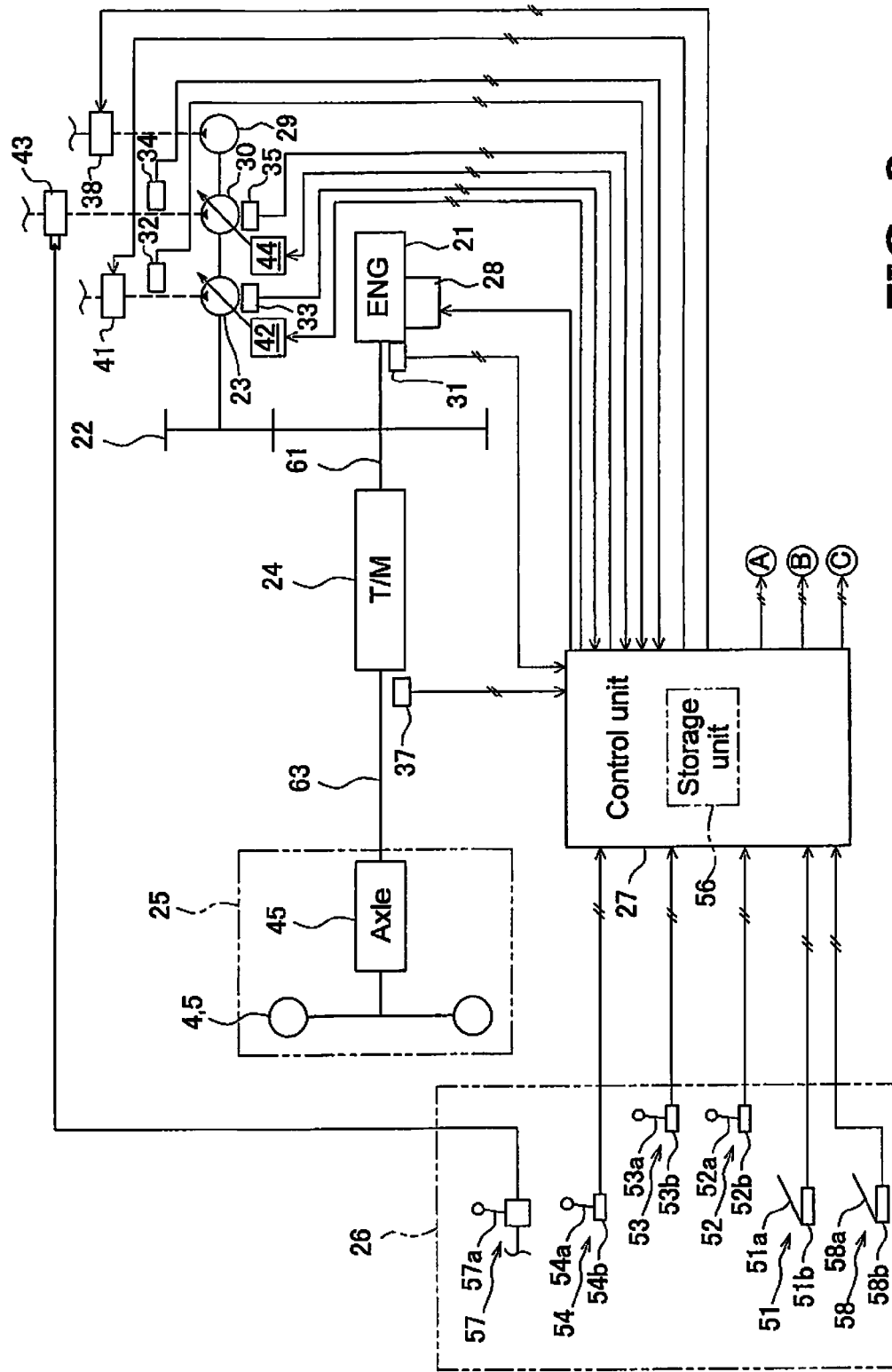
FIG. 2 is a schematic view of a configuration of the work vehicle.

FIG. 2 is a schematic view of a configuration of the work vehicle 1. As illustrated in FIG. 2, the work vehicle 1 is equipped with an engine 21, a power take-off (PTO) 22, a power transmission device 24, a travel device 25, an operating device 26, and a control unit 27.

The engine 21 is, for example, a diesel engine. The output of the engine 21 is controlled by adjusting the amount of fuel injected into the cylinders of the engine 21. The adjustment of the amount of fuel is conducted by the control unit 27 controlling a fuel injection device 28 attached to the engine 21. The work vehicle 1 is equipped with an engine rotation speed detecting unit 31. The engine rotation speed detecting unit 31 detects the engine rotation speed and transmits a detection signal indicating the engine rotation speed to the control unit 27.

The work vehicle 1 has the work implement pump 23, the steering pump 30, and a transmission pump 29. The work implement pump 23, the steering pump 30, and the transmission pump 29 are hydraulic pumps. The PTO (power take-off) 22 transmits a portion of the driving power from the engine 21 to the hydraulic pumps 23, 30, and 29. That is, the PTO 22 distributes the driving power from the engine 21 to the power transmission device 24 and the hydraulic pumps 23, 30, and 29.

The work implement pump 23 is driven by driving power from the engine 21. The hydraulic fluid discharged from the work implement pump 23 is supplied to the lift cylinder 13 and the bucket cylinder 14 through a work implement control valve 41. The work vehicle 1 is equipped with a work implement pump pressure detecting unit 32. The work implement pump pressure detecting unit 32 detects a discharge pressure (referred to below as "work implement pump pressure") of hydraulic fluid from the work implement pump 23 and transmits a detection signal indicating the work implement pump pressure to the control unit 27.

The work implement pump 23 is a variable displacement hydraulic pump. The discharge capacity of the work implement pump 23 is changed by changing the tilt angle of a skew plate or an inclined shaft of the work implement pump 23. A first capacity control device 42 is connected to the work implement pump 23. The first capacity control device 42 is controlled by the control unit 27 and changes the tilt angle of the work implement pump 23. As a result, the discharge capacity of the work implement pump 23 is controlled by the control unit 27. The work vehicle 1 is equipped with a first tilt angle detecting part 33. The first tilt angle detecting part 33 detects the tilt angle of the work implement pump 23 and transmits a detection signal indicating the tilt angle to the control unit 27.

The steering pump 30 is driven by driving power from the engine 21. The hydraulic fluid discharged from the steering pump 30 is supplied to the above-mentioned steering cylinder 18 through a steering control valve 43. The work vehicle 1 is equipped with a steering pump pressure detecting unit 34. The steering pump pressure detecting unit 34 detects the discharge pressure (referred to below as "steering pump pressure") of hydraulic fluid from the steering pump 30 and transmits a detection signal indicating the steering pump pressure to the control unit 27.

The steering pump 30 is a variable displacement hydraulic pump. The discharge capacity of the steering pump 30 is changed by changing the tilt angle of a skew plate or an inclined shaft of the steering pump 30. A second capacity control device 44 is connected to the steering pump 30. The second capacity control device 44 is controlled by the control unit 27 and changes the tilt angle of the steering pump 30. As a result, the discharge capacity of the steering pump 30 is controlled by the control unit 27. The work vehicle 1 is equipped with a second tilt angle detecting part 35. The second tilt angle detecting part 35 detects the tilt angle of the steering pump 30 and transmits a detection signal indicating the tilt angle to the control unit 27.

The transmission pump 29 is driven by driving power from the engine 21. The transmission pump 29 is a fixed displacement hydraulic pump. The hydraulic fluid discharged from the transmission pump 29 is supplied to below-mentioned clutches CF, CR, CL, CH, Cm1, and Cm2 of the power transmission device 24 via a clutch control valve 38.

The PTO 22 transmits a portion of the driving power from the engine 21 to the power transmission device 24. The power transmission device 24 transmits the driving power from the engine 21 to the travel device 25. The power transmission device 24 changes the speed in the driving power from the engine 21 and outputs it. An explanation of the configuration of the power transmission device 24 is provided in detail below.

The travel device 25 has an axle 45 and the traveling wheels 4 and 5. The axle 45 transmits driving power from the power transmission device 24 to the traveling wheels 4 and 5. As a result, the traveling wheels 4 and 5 rotate. The work vehicle 1 is equipped with a vehicle speed detecting unit 37. The vehicle speed detecting unit 37 detects the rotation speed (referred to below as "output rotation speed") of an output shaft 63 of the power transmission device 24. The output rotation speed corresponds to the vehicle speed and consequently the vehicle speed detecting unit 37 detects the vehicle speed by detecting the output rotation speed. The vehicle speed detecting unit 37 detects the rotating direction of the output shaft 63. The rotating direction of the output shaft 63 corresponds to the traveling direction of the work vehicle 1 and consequently the vehicle speed detecting unit 37 functions as a travelling direction detecting unit that detects the traveling direction of the work vehicle 1 by detecting the rotating direction of the output shaft 63. The vehicle speed detecting unit 37 transmits detection signals indicating the output rotation speed and the rotating direction to the control unit 27.

The operating device 26 is operated by an operator. The operating device 26 has an accelerator operating device 51, a work implement operating device 52, a speed change operating device 53, a forward/reverse travel operating device 54 (referred to below as "FR operating device 54"), a steering operating device 57, and a brake operating device 58.

The accelerator operating device 51 has an accelerator operating member 51*a* and an accelerator operation detecting unit 51*b*. The accelerator operating member 51*a* is operated in order to set a target rotation speed of the engine 21. The accelerator operation detecting unit 51*b* detects an operating amount (referred to below as "accelerator operating amount") of the accelerator operating member 51*a*. The accelerator operation detecting unit 51*b* transmits a detection signal indicating the accelerator operating amount to the control unit 27.

The work implement operating device 52 has a work implement operating member 52*a* and a work implement operation detecting unit 52*b*. The work implement operating member 52*a* is operated in order to actuate the work implement 3. The work implement operation detecting unit 52*b* detects a position of the work implement operating member 52*a*. The work implement operation detecting unit 52*b* outputs a detection signal indicating the position of the work implement operating member 52*a* to the control unit 27. The work implement operation detecting unit 52*b* detects an operating amount of the work implement operating member 52*a* by detecting a position of the work implement operating member 52*a*.

The speed change operating device 53 has a speed change operating member 53*a* and a speed change operation detecting unit 53*b*. The speed change operating member 53*a* is a member for selecting a speed range that defines an upper limit of the vehicle speed. The operator is able to select a speed range of the power transmission device 24 by operating the speed change operating member 53*a*. The speed change operation detecting unit 53*b* detects a position of the speed change operating member 53a. The position of the speed change operating member 53a corresponds to a plurality of speed ranges, such as a first speed and a second speed and the like. The speed change operation detecting unit 53b outputs a detection signal indicating the position of the speed change operating member 53a to the control unit 27.

The FR operating device 54 has a forward/reverse travel operating member 54a (referred to below as "FR operating member 54a") and a forward/reverse travel position detecting unit 54b (referred to below as a "FR position detecting unit 54b"). The operator can switch between forward and reverse travel of the work vehicle 1 by operating the FR operating member 54a. The FR operating member 54a is selectively switched between a forward travel position (F), a neutral position (N), and a reverse travel position (R). The FR position detecting unit 54b detects a position of the FR operating member 54a. The FR position detecting unit 54b outputs a detection signal indicating the position of the FR operating member 54a to the control unit 27.

The steering operating device 57 has a steering operating member 57a. The steering operating device 57 drives a steering control valve 43 by supplying pilot hydraulic pressure based on an operation of the steering operating member 57a to the steering control valve 43. The steering operating device 57 may drive the steering control valve 43 by converting an operation of the steering operating member 57a to an electrical signal. The operator is able to change the travel direction of the work vehicle 1 to the right or left by operating the steering operating member 57a.

The brake operating device 58 has a brake operating member 58a and a brake operation detecting unit 58b. The operator is able to operate a deceleration force of the work vehicle 1 by operating the brake operating member 58a. The brake operation detecting unit 58b detects an operating amount of the brake operating member 58a (referred to below as "brake operating amount"). The brake operation detecting unit 58b outputs a detection signal indicating the brake operating amount to the control unit 27. The pressure of the brake oil may be used as the brake operating amount.

The control unit 27 has a calculation device, such as a CPU, and a memory, such as a RAM or a ROM, and conducts processing for controlling the work vehicle 1. The control unit 27 has a storage unit 56. The storage unit 56 stores programs and data for controlling the work vehicle 1.

The control unit 27 transmits a command signal indicating a command throttle value to the fuel injection device 28 so that a target rotation speed of the engine 21 is obtained in accordance with the accelerator operating amount. The control of the engine 21 by the control unit 27 is described in detail below.

The control unit 27 controls hydraulic pressure supplied to the hydraulic cylinders 13 and 14 by controlling the work implement control valve 41 on the basis of the detection signals from the work implement operation detecting unit 52b. As a result, the hydraulic cylinders 13 and 14 expand or contract to operate the work implement 3.

The control unit 27 controls the power transmission device 24 on the basis of the detection signals from each of the detecting units. The control of the power transmission device 24 by the control unit 27 is described in detail below.

Figure 3:
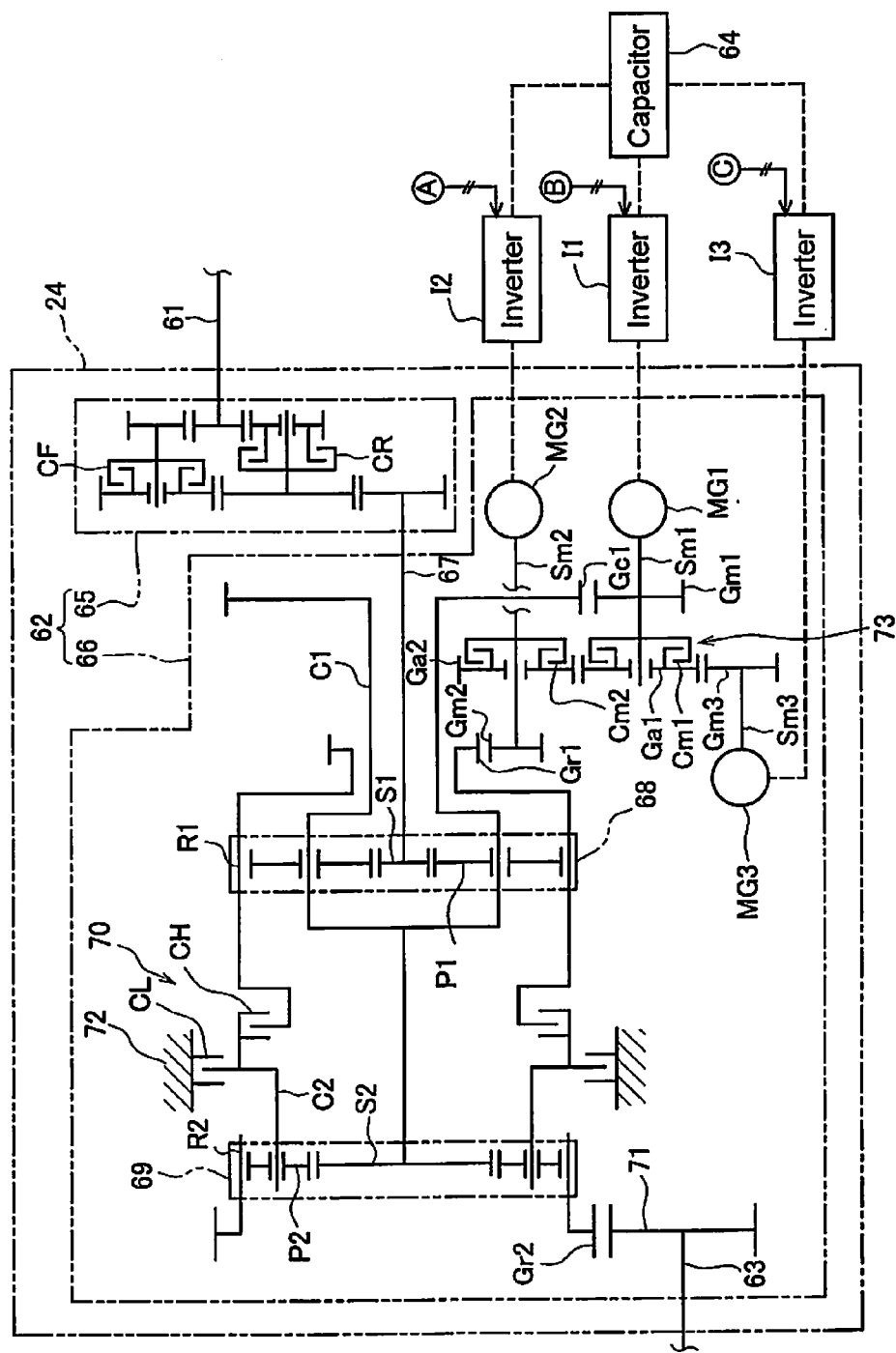
FIG. 3 is a schematic view of a configuration of a power transmission device.

An explanation of the configuration of the power transmission device 24 is provided in detail below. FIG. 3 is a schematic view of a configuration of the power transmission device 24. As illustrated in FIG. 3, the power transmission device 24 is provided with an input shaft 61, a gear mechanism 62, the output shaft 63, a first motor MG1, a second motor MG2, a third motor MG3, and a capacitor 64. The input shaft 61 is connected to the abovementioned PTO 22. The rotation from the engine 21 is inputted to the input shaft 61 via the PTO 22. The gear mechanism 62 transmits the rotation of the input shaft 61 to the output shaft 63. The output shaft 63 is connected to the above-mentioned travel device 25, and transmits the rotation from the gear mechanism 62 to the above-mentioned travel device 25.

The gear mechanism 62 is a mechanism for transmitting driving power from the engine 21. The gear mechanism 62 is configured so that the rotation speed ratio of the output shaft 63 with respect to the input shaft 61 is changed in response to changes in the rotation speeds of the motors MG1, MG2, and MG3. The gear mechanism 62 has a FR switch mechanism 65, and a speed change mechanism 66.

The FR switch mechanism 65 has a forward travel clutch CF (referred to below as "F-clutch CF"), a reverse travel clutch CR (referred to below as "R-clutch CR"), and various other gears not illustrated. The F-clutch CF and the R-clutch CR are hydraulic clutches and hydraulic fluid is supplied from the transmission pump 29 to the clutches CF and CR. The hydraulic fluid for the F-clutch CF is controlled by the clutch control valve 38 illustrated in FIG. 2. The hydraulic fluid for the R-clutch CR is controlled by the clutch control valve 38. The clutch control valve 38 is controlled by command signals from the control unit 27.

The direction of the rotation outputted from the FR switch mechanism 65 is switched due to the switching between connected/disconnected states of the F-clutch CF and disconnected/connected states of the R-clutch CR. Specifically, the F-clutch CF is connected and the R-clutch CR is disconnected when the vehicle is traveling forward. The F-clutch CF is disconnected and the R-clutch CR is connected when the vehicle is traveling in reverse.

The speed change mechanism 66 has a transmission shaft 67, a first planetary gear mechanism 68, a second planetary gear mechanism 69, a Hi/Lo switch mechanism 70, and an output gear 71. The transmission shaft 67 is coupled to the FR switch mechanism 65. The first planetary gear mechanism 68 and the second planetary gear mechanism 69 are disposed on the same axis as the transmission shaft 67.

The first planetary gear mechanism 68 has a first sun gear S1, a plurality of first planet gears P1, a first carrier C1 that supports the plurality of first planet gears P1, and a first ring gear R1. The first sun gear S1 is coupled to the transmission shaft 67. The plurality of first planet gears P1 mesh with the first sun gear S1 and are supported in a rotatable manner by the first carrier C1. A first carrier gear Gc1 is provided on an outer peripheral part of the first carrier C1. The first ring gear R1 meshes with the plurality of first planet gears P1 and is able to rotate. A first ring outer periphery gear Gr1 is provided on the outer periphery of the first ring gear R1.

The second planetary gear mechanism 69 has a second sun gear S2, a plurality of second planet gears P2, a second carrier C2 that supports the plurality of second planet gears P2, and a second ring gear R2. The second sun gear S2 is coupled to the first carrier C1. The plurality of second planet gears P2 mesh with the second sun gear S2 and are supported in a rotatable manner by the second carrier C2. The second ring gear R2 meshes with the plurality of second planet gears P2 and is able to rotate. A second ring outer periphery gear Gr2 is provided on the outer periphery of the second ring gear R2. The second ring outer periphery gear Gr2 meshes with the output gear 71, and the rotation of the second ring gear R2 is outputted to the output shaft 63 via the output gear 71.

The Hi/Lo switch mechanism 70 is a mechanism for switching the driving power drivetrain of the power transmission device 24 between a high-speed mode (Hi mode) in which the vehicle speed is high and a low-speed mode (Lo mode) in which the vehicle speed is low. The Hi/Lo switch mechanism 70 has an H-clutch CH that is connected during the Hi mode and a L-clutch CL that is connected during the Lo mode. The H-clutch CH connects or disconnects the first ring gear R1 and the second carrier C2. The L-clutch CL connects or disconnects the second carrier C2 and a fixed end 72 to prohibit or allow the rotation of the second carrier C2.

The clutches CH and CL are hydraulic clutches, and hydraulic fluid from the transmission pump 29 is supplied to each of the clutches CH and CL. The hydraulic fluid for the H-clutch CH is controlled by the clutch control valve 38. The hydraulic fluid for the L-clutch CL is controlled by the clutch control valve 38.

The first motor MG1 and the second motor MG2 function as drive motors that generate driving power using electrical energy. The first motor MG1 and the second motor MG2 also function as generators that use inputted driving power to generate electrical energy. The first motor MG1 functions as a generator when a command signal from the control unit 27 is applied so as to activate torque in the reverse direction of the rotating direction of the first motor MG1. A first motor gear Gm1 is fixed to a rotating shaft Sm1 of the first motor MG1 and the first motor gear Gm1 meshes with the first carrier gear Gc1.

The second motor MG2 is configured in the same way as the first motor MG1. A second motor gear Gm2 is fixed to a rotating shaft Sm2 of the second motor MG2 and the second motor gear Gm2 meshes with the first ring outer periphery gear Gr1.

The third motor MG3 assists the first motor MG1 and the second motor MG2. The third motor MG3 is configured in the same way as the first motor MG1 and the second motor MG2. The speed change mechanism 66 has a motor switching mechanism 73, and the motor switching mechanism 73 selectively switches the target of the assistance from the third motor MG3 to the first motor MG1 or the second motor MG2.

Specifically, the motor switching mechanism 73 has a first motor clutch Cm1, a second motor clutch Cm2, a first connecting gear Ga1, and a second connecting gear Ga2. A third motor gear Gm3 is connected to a rotating shaft Sm3 of the third motor MG3, and the third motor gear Gm3 meshes with the first connecting gear Ga1. The first motor clutch Cm1 switches between connecting and disconnecting the first connecting gear Ga1 and the rotating shaft Sm1 of the first motor MG1. The first connecting gear Ga1 meshes with the second connecting gear Ga2. The second motor clutch Cm2 switches between connecting and disconnecting the second connecting gear Ga2 and the rotating shaft Sm2 of the second motor MG2.

The first motor clutch Cm1 and the second motor clutch Cm2 are hydraulic clutches. Hydraulic oil from the transmission pump 29 is supplied to each of the motor clutches Cm1 and Cm2. The hydraulic fluid for the motor clutches Cm1 and Cm2 is controlled by the clutch control valve 38.

The motor switching mechanism 73 is able to switch the third motor MG3 between a first connected state, a second connected state, and a disconnected state. The first motor clutch Cm1 is connected and the second motor clutch Cm2 is disconnected in the first connected state. That is, the third motor MG3 is connected to the first motor MG1 and assists the first motor MG1 in the first connected state. The second motor clutch Cm2 is connected and the first motor clutch Cm2 is disconnected in the second connected state. That is, the third motor MG3 is connected to the second motor MG2 and assists the second motor MG2 in the second connected state. The first motor clutch Cm1 and the second motor clutch Cm2 are disconnected in the disconnected state. That is, the third motor MG3 is disconnected from the first motor MG1 and the second motor MG2 and does not assist the first motor MG1 and the second motor MG2 in the disconnected state.

The first motor MG1 is connected to the capacitor 64 via a first inverter I1. The second motor MG2 is connected to the capacitor 64 via a second inverter I2. The third motor MG3 is connected to the capacitor 64 via a third inverter I3.

The capacitor 64 functions as an energy reservoir unit for storing energy generated by the motors MG1, MG2, and MG3. That is, the capacitor 64 stores electrical power generated in the motors MG1, MG2, and MG3 when the total electrical power generation amount of the motors MG1 and MG2 is high. The capacitor 64 releases electrical power when the total electrical power consumption amount of the motors MG1, MG2, and MG3 is high. That is, the motors MG1, MG2, and MG3 are driven by electrical power stored in the capacitor 64. Alternatively, the motors MG1, MG2, and MG3 can drive using the electrical power stored in the capacitor 64. A battery may be used as another electrical power storage means in place of the capacitor. Further, a boosting transformer may be provided for adjusting the voltage between the electrical power storage means and the inverters.

The control unit 27 receives detection signals from the various detecting units and applies command signals for indicating the command torques for the motors MG1, MG2, and MG3 to inverters I1, I2, and I3. The control unit 27 may output rotation speed commands to the motors MG1, MG2, and MG3. In this case, the inverters I1, I2, and I3 control the motors MG1, MG2, and MG3 by calculating command torques corresponding to the rotation speed commands. The control unit 27 applies the command signals for controlling the clutch hydraulic pressure of the clutches CF, CR, CH, CL, Cm1, and Cm2 to the clutch control valve 38. The clutch control valve 38 includes a plurality of valves for controlling the clutches CF, CR, CH, CL, Cm1, and Cm2.

The speed change ratio and the output torque of the power transmission device 24 are controlled by controlling the motors MG1, MG2, and MG3 and the clutches CF, CR, CH, CL, Cm1, and Cm2 with command signals from the control unit 27. The following is an explanation of the operations of the power transmission device 24.

Figure 4:
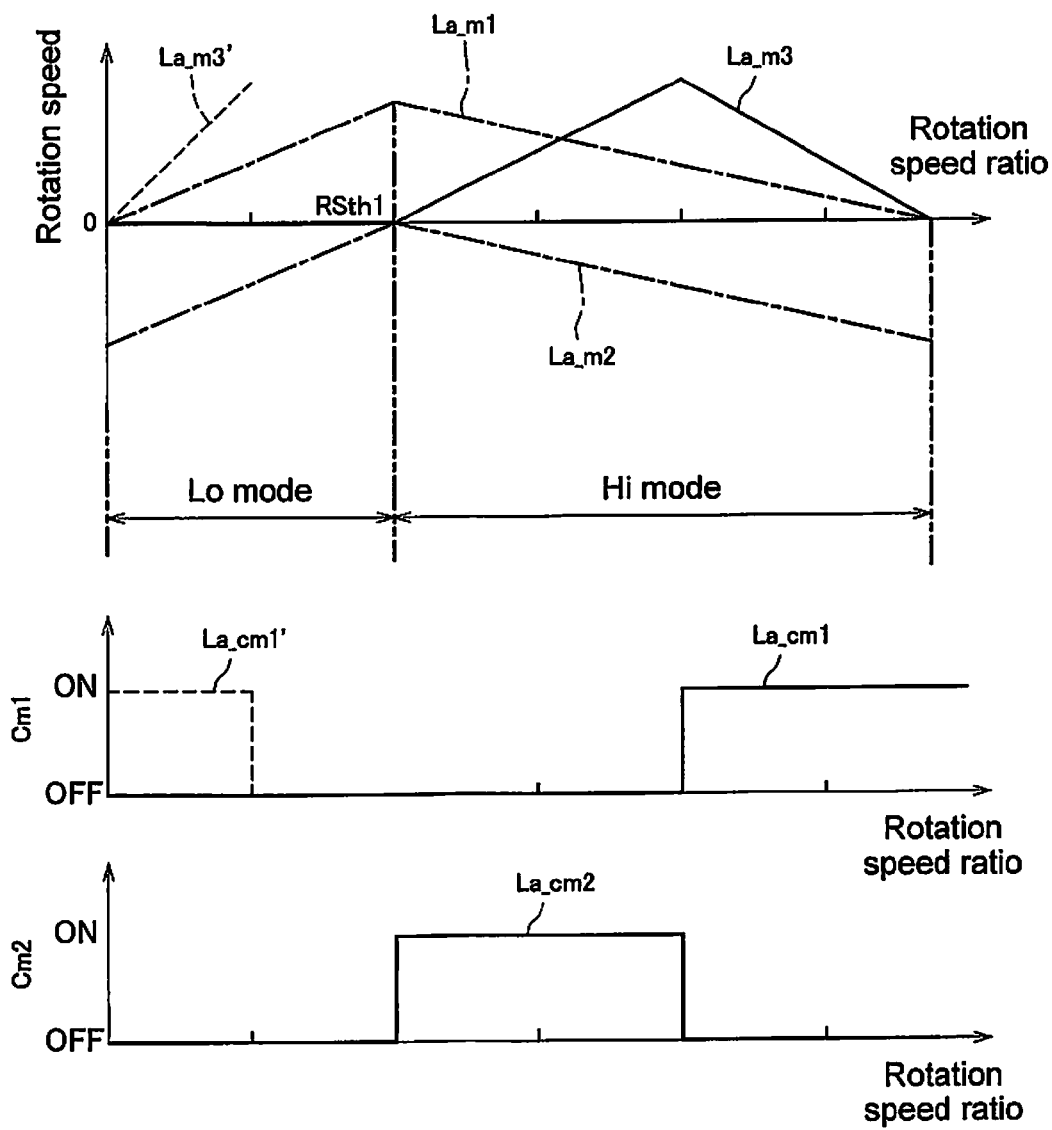
FIG. 4 illustrates changes in rotation speeds of a first motor, a second motor, and a third motor with respect to the rotation speed ratio.

An outline of operations of the power transmission device 24 when the vehicle speed increases from zero in the forward travel side while the rotation speed of the engine 21 remains fixed, will be explained with reference to FIG. 4. That is, FIG. 4 illustrates the relationship between the rotation speeds of the motors MG1, MG2, and MG3 and the rotation speed ratio of the power transmission device 24. When the rotation speed of the engine 21 is fixed, the vehicle speed changes in response to the rotation speed ratio of the power transmission device 24. The rotation speed ratio is the ratio of the rotation speed of the output shaft 63 with respect to the rotation speed of the input shaft 61. Therefore, the change in the vehicle speed in FIG. 4 matches the changes of the rotation speed ratio of the power transmission device 24. That is, FIG. 4 illustrates the rotation speeds of the motors MG1, MG2, and MG3 with respect to the vehicle speed. The long dashed short dashed line La_m1 in FIG. 4 depicts the rotation speed of the first motor MG1, and the long dashed short dashed line La_m2 depicts the rotation speed of the second motor MG2. The solid line La_m3 and the dashed line La_m3' depict the rotation speed of the third motor MG3. The rotation speeds of the motors MG1, MG2, and MG3 on the vertical axis in FIG. 4 may be a ratio of the rotation speeds of the motors MG1, MG2, and MG3 with respect to the rotation speed of the engine 21.

FIG. 4 further illustrates the connected (ON) states and the disconnected (OFF) states of the first motor clutch Cm1 and the second motor clutch Cm2. The solid line La_cm1 and the dashed line La_cm1' depict changes in the command signals to the first motor clutch Cm1 in FIG. 4. The solid line La_cm2 depicts changes in the command signals to the second motor clutch Cm2.

The driving power drivetrain of the power transmission device 24 is in the Lo mode when the rotation speed ratio is a value between zero and a predetermined threshold RSTh1. The L-clutch CL is connected and the H-clutch CH is disconnected in the Lo mode. Because the H-clutch CH is disconnected in the Lo mode, the second carrier C2 and the first ring gear R1 are disconnected. Because the L-clutch CL is connected, the second carrier C2 is fixed.

The driving power from the engine 21 in the Lo mode is inputted to the first sun gear S1 via the transmission shaft 67, and the driving power is outputted from the first carrier C1 to the second sun gear S2. Conversely, the driving power inputted to the first sun gear S1 is transmitted from the first planet gears P1 to the first ring gear R1 and outputted through the first ring outer periphery gear Gr1 and the second motor gear Gm2 to the second motor MG2. The second motor MG2 functions mainly as a generator in the Lo mode, and a portion of the electrical power generated by the second motor MG2 is stored in the capacitor 64. A portion of the electrical power generated by the second motor MG2 is consumed in the driving of the first motor MG1.

The first motor MG1 functions mainly as an electric motor in the Lo mode. The driving power of the first motor MG1 is outputted to the second sun gear S2 along a path from the first motor gear Gm1 to the first carrier gear Gc1 to the first carrier C1. At this time, the electrical power for driving the first motor MG1 is supplied from the second motor MG2 or from the capacitor 64 as needed. The driving power outputted to the second sun gear S2 as described above is transmitted to the output shaft 63 along a path from the second planet gears P2 to the second ring gear R2 to the second ring outer periphery gear Gr2 to the output gear 71.

When assistance from the third motor MG3 is determined to be required in the Lo mode, the third motor MG3 is connected to the first motor MG1 or to the second motor MG2. When assistance from the third motor MG3 is determined as not being required, the third motor MG3 is disconnected from the first motor MG1 and the second motor MG2 to enter the disconnected state. The first motor clutch Cm1 and the second motor clutch Cm2 are disconnected when the assistance from the third motor MG3 is determined as not required. The solid line La_m3 in the Lo mode in FIG. 4 depicts the rotation speed of the third motor MG3 when assistance from the third motor MG3 is not required.

When the third motor MG3 assists the first motor MG1 in the Lo mode, the first motor clutch Cm1 is connected and the second motor clutch Cm2 is disconnected. Therefore, the first connecting gear Ga1 is connected to the rotating shaft Sm3 of the first motor MG1 and the second connecting gear Ga2 is disconnected from the rotating shaft Sm2 of the second motor MG2. As a result, the third motor MG3 is connected to the first motor MG1 via the third motor gear Gm3, the first connecting gear Ga1, and the first motor clutch Cm1. The third motor MG3 is disconnected from the second motor MG2 because the second motor clutch Cm2 is disconnected. The dashed line La_m3' in the Lo mode in FIG. 4 depicts the rotation speed of the third motor MG3 when the first motor MG1 is assisted by the third motor MG3.

When the third motor MG3 assists the second motor MG2 in the Lo mode, the first motor clutch Cm1 is disconnected and the second motor clutch Cm2 is connected. Therefore, the second connecting gear Ga2 is connected to the rotating shaft Sm2 of the second motor MG2 and the first connecting gear Ga1 is disconnected from the rotating shaft Sm1 of the first motor MG1. As a result, the third motor MG3 is connected to the second motor MG2 via the third motor gear Gm3, the first connecting gear Ga1, the second connecting gear Ga2 and the second motor clutch Cm2. The third motor MG3 is disconnected from the first motor MG1 because the first motor clutch Cm1 is disconnected.

The driving power drivetrain of the power transmission device 24 is in the Hi mode when the rotation speed ratio is a value that exceeds RSTh1. The H-clutch CH is connected and the L-clutch CL is disconnected in the Hi mode. Because the H-clutch CH is connected in the Hi mode, the second carrier C2 and the first ring gear R1 are connected. Because the L-clutch CL is disconnected, the second carrier C2 is disconnected. Therefore, the rotation speed of the first ring gear R1 and the second carrier C2 match.

The driving power from the engine 21 in the Hi mode is inputted to the first sun gear S1 and the driving power is outputted from the first carrier C1 to the second sun gear S2. The driving power inputted to the first sun gear S1 is outputted from the first carrier C1 through the first carrier gear Gc1 and the first motor gear Gm1 to the first motor MG1. The first motor MG1 functions mainly as a generator in the Hi mode, and thus a portion of the electrical power generated by the first motor MG1 is stored in the capacitor 64. A portion of the electrical power generated by the first motor MG1 is consumed in the driving of the second motor MG2.

The driving power of the second motor MG2 is outputted to the second carrier C2 along a path from the second motor gear Gm2 to the first ring outer periphery gear Gr1 to the first ring gear R1 to the H-clutch CH. At this time, the electrical power for driving the second motor MG2 is supplied from the first motor MG1 or from the capacitor 64 as needed. The driving power outputted to the second sun gear S2 as described above is outputted through the second planet gears P2 to the second ring gear R2, and the driving power outputted to the second carrier C2 is outputted through the second planet gears P2 to the second ring gear R2. The driving power combined by the second ring gear R2 in this way is transmitted through the second ring outer periphery gear Gr2 and the output gear 71 to the output shaft 63.

The third motor MG3 is connected to either of the first motor MG1 or the second motor MG2 in the Hi mode. When the third motor MG3 assists the first motor MG1 in the Hi mode, the first motor clutch Cm1 is connected and the second motor clutch Cm2 is disconnected in the same way as in the Lo mode. Therefore, the first connecting gear Ga1 is connected to the rotating shaft Sm3 of the first motor MG1 and the second connecting gear Ga2 is disconnected from the rotating shaft Sm2 of the second motor MG2. As a result, the third motor MG3 is connected to the first motor MG1 via the third motor gear Gm3, the first connecting gear Ga1, and the first motor clutch Cm1. The third motor MG3 is disconnected from the second motor MG2 because the second motor clutch Cm2 is disconnected.

When the third motor MG3 assists the second motor MG2 in the Hi mode, the first motor clutch Cm1 is disconnected and the second motor clutch Cm2 is connected. Therefore, the second connecting gear Ga2 is connected to the rotating shaft Sm2 of the second motor MG2 and the first connecting gear Ga1 is disconnected from the rotating shaft Sm1 of the first motor MG1. As a result, the third motor MG3 is connected to the second motor MG2 via the third motor gear Gm3, the first connecting gear Ga1, the second connecting gear Ga2 and the second motor clutch Cm2. The third motor MG3 is disconnected from the first motor MG1 because the first motor clutch Cm1 is disconnected.

While forward travel driving has been discussed above, the operations of reverse travel driving are the same. During braking, the roles of the first motor MG1 and the second motor MG2 as generator and motor are reversed from the above explanation.

The control of the power transmission device 24 by the control unit 27 is described in detail below. The control unit 27 controls the output torque of the power transmission device 24 by controlling the motor torque of the first motor MG1, the second motor MG2, and the third motor MG3. That is, the control unit 27 controls the tractive force of the work vehicle 1 by controlling the motor torque of the first motor MG1, the second motor MG2, and the third motor MG3.

Figure 5:
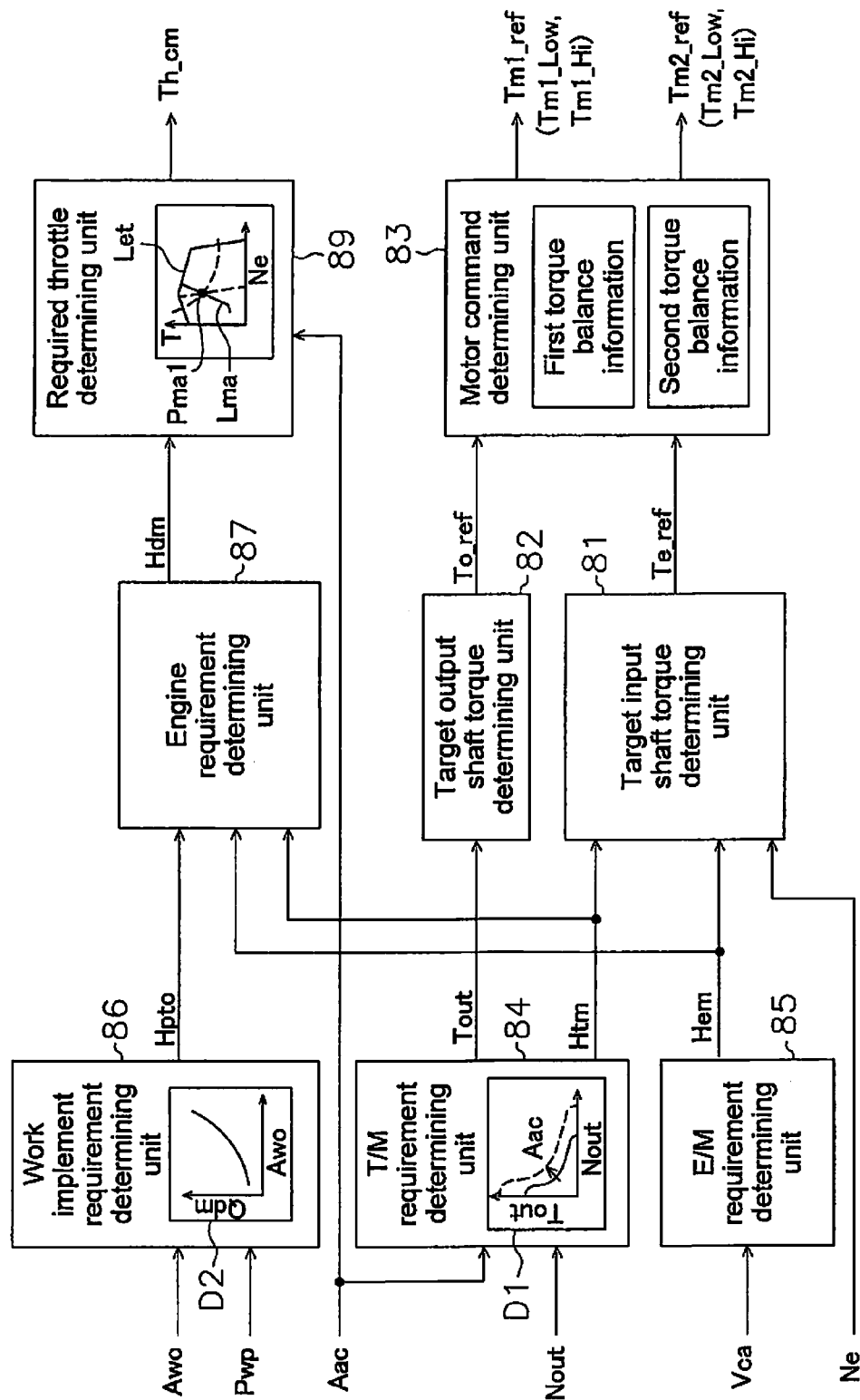
FIG. 5 is a control block diagram illustrating processing executed by the control unit.

A method for determining the command torques to the first motor MG1 and the second motor MG2 is explained below. FIG. 5 is a control block diagram illustrating processing executed by the control unit 27. The control unit 27 has a transmission requirement determining unit 84, an energy management requirement determining unit 85, and a work implement requirement determining unit 86 as illustrated in FIG. 5.

The transmission requirement determining unit 84 determines a required tractive force Tout on the basis of an accelerator operating amount Aac and an output rotation speed Nout. Specifically, the transmission requirement determining unit 84 determines the required tractive force Tout from the output rotation speed Nout on the basis of required tractive force characteristics information D1 stored in the storage unit 56. The required tractive force characteristics information D1 is data indicating the required tractive force characteristics for defining the relationship between the output rotation speed Nout and the required tractive force Tout. The required tractive force characteristics are changed in response to the accelerator operating amount Aac. The required tractive force characteristics correspond to predetermined vehicle speed—tractive force characteristics. The transmission requirement determining unit 84 uses the required tractive force characteristics corresponding to the accelerator operating amount Aac to determine the required tractive force Tout from the output rotation speed Nout and to determine a transmission required horsepower Htm that is a product of the output rotation speed Nout and the required tractive force Tout.

The energy management requirement determining unit 85 determines an energy management required horsepower Hem on the basis of a remaining amount of electrical power in the capacitor 64. For example the energy management required horsepower Hem is a horsepower required by the power transmission device 24 for charging the capacitor 64. The energy management requirement determining unit 85 determines a current capacitor capacity from a voltage Vca of the capacitor 64. The energy management requirement determining unit 85 increases the energy management required horsepower Hem as the current capacitor capacity becomes smaller.

The work implement requirement determining unit 86 determines the work implement required horsepower Hpto on the basis of a work implement pump pressure Pwp and an operating amount Awo (referred to below as "work implement operating amount Awo") of the work implement operating member 52a. In the present exemplary embodiment, the work implement required horsepower Hpto is a horsepower distributed to the work implement pump 23. However, the work implement required horsepower Hpto may include a horsepower distributed to the steering pump 30 and/or the transmission pump 29. Specifically, the work implement requirement determining unit 86 determines a required flow rate Qdm of the work implement pump 23 from the work implement operating amount Awo on the basis of required flow rate information D2. The required flow rate information D2 is stored in the storage unit 56 and defines the relationship between the required flow rate Qdm and the work implement operating amount Awo. The work implement requirement determining unit 86 determines the work implement required horsepower Hpto from the required flow rate Qdm and the work implement pump pressure Pwp.

The control unit 27 has a target output shaft torque determining unit 82, a target input shaft torque determining unit 81, and a motor command determining unit 83.

The target output shaft torque determining unit 82 determines a target output shaft torque To_ref. The target output shaft torque To_ref is a target value for the torque to be outputted from the power transmission device 24. The target output shaft torque determining unit 82 determines the target output shaft torque To_ref on the basis of the required tractive force Tout determined by the transmission requirement determining unit 84. Specifically, the target output shaft torque To_ref is determined by multiplying the required tractive force Tout by a predetermined distribution ratio. The predetermined distribution ratio is set, for example, so that the total of the work implement required horsepower Hpto, the transmission required horsepower Htm, and the energy management required horsepower Hem does not exceed the output horsepower from the engine 21.

The target input shaft torque determining unit 81 determines a target input shaft torque Te_ref. The target input shaft torque Te_ref is a target value for the torque to be inputted to the power transmission device 24. The target input shaft torque determining unit 81 determines the target input shaft torque Te_ref on the basis of the transmission required horsepower Htm and the energy management required horsepower Hem.

Specifically, the target input shaft torque determining unit 81 calculates the target input shaft torque Te_ref by multiplying the engine rotation speed Ne by the sum of the energy management required horsepower Hem and the value of the transmission required horsepower Htm multiplied by the predetermined distribution ratio. The transmission required horsepower Htm is calculated by multiplying the above-mentioned required tractive force Tout by the current output rotation speed Nout.

The motor command determining unit 83 uses the torque-balance information to determine command torques Tm1_ref and Tm2_ref for the motors MG1 and MG2 from the target input shaft torque Te_ref and the target output shaft torque To_ref. The torque-balance information defines a relationship between the target input shaft torque Te_ref and the target output shaft torque To_ref so as to achieve a balance among the torques of the power transmission device 24. The torque-balance information is stored in the storage unit 56.

As described above, the transmission paths of the driving power in the power transmission device 24 are different for the Lo mode and the Hi mode. As a result, the motor command determining unit 83 uses different torque-balance information to determine the command torques Tm1_ref and Tm2_ref for the motors MG1 and MG2 in the Lo mode and the Hi mode. Specifically, the motor command determining unit 83 uses first torque-balance information represented by equation 1 below to determine command torques Tm1_Low and Tm2_Low for the motors MG1 and MG2 in the Lo mode. In the present exemplary embodiment, the first torque-balance information is an equation for balancing the torques of the power transmission device 24.

$Ts1\_Low = Te\_ref * r\_fr$ $Tc1\_Low = Ts1\_Low * (-1) * ((Zr1/Zs1)+1)$ $Tr2\_Low = To\_ref * (Zod/Zo)$ $Ts2\_Low = Tr2\_Low * (Zs2/Zr2)$ $Tcp1\_Low = Tc1\_Low + Ts2\_Low$ $Tm1\_Low = Tcp1\_Low * (-1) * (Zp1/Zp1d)$ $Tr1\_Low = Ts1\_Low * (Zr1/Zs1)$ $Tm2\_Low = Tr1\_Low * (-1) * (Zp2/Zp2d)$   Equation 1

The motor command determining unit 83 uses second torque-balance information represented by equation 2 below to determine command torques Tm1_Hi and Tm2_Hi for the motors MG1 and MG2 in the Hi mode. In the present embodiment, the second torque-balance information is an equation for balancing the torques of the power transmission device 24.

$Ts1\_Hi = Te\_ref * r\_fr$ $Tc1\_Hi = Ts1\_Hi * (-1) * ((Zr1/Zs1)+1)$ $Tr2\_Hi = To\_ref * (Zod/Zo)$ $Ts2\_Hi = Tr2\_Hi * (Zs2/Zr2)$ $Tcp1\_Hi = Tc1\_Hi + Ts2\_Hi$ $Tm1\_Hi = Tcp1\_Hi * (-1) * (Zp1/Zp1d)$ $Tr1\_Hi = Ts1\_Hi * (Zr1/Zs1)$ $Tc2\_Hi = Tr2\_Hi * (-1) * ((Zs2/Zr2)+1)$ $Tcp2\_Hi = Tr1\_Hi + Tc2\_Hi$ $Tm2\_Hi = Tcp2\_Hi * (-1) * (Zp2/Zp2d)$   Equation 2

The contents of the parameters in each torque-balance information are depicted in Table 1 below.

TABLE 1

| | |
|---|---|
| Te_ref | Target input shaft torque |
| To_ref | Target output shaft torque |
| r_fr | Deceleration ratio for the FR switch mechanism 65 (The FR switch mechanism 65 decelerates the engine rotation speed at 1/r_fr to output. When the FR switch mechanism 65 is in the forward travel state, r_fr is a negative value. When the FR switch mechanism 65 is in the reverse travel state, r_fr is a positive value.) |
| Zs1 | Number of teeth of the sun gear S1 in the first planetary gear mechanism 68. |
| Zr1 | Number of teeth of the ring gear R1 in the first planetary gear mechanism 68. |
| Zp1 | Number of teeth in the first carrier gear Gc1 |
| Zp1d | Number of teeth of the first motor gear Gm1 |
| Zs2 | Number of teeth of the sun gear S2 in the second planetary gear mechanism 69. |
| Zr2 | Number of teeth of the ring gear R2 in the second planetary gear mechanism 69. |
| Zp2 | Number of teeth of the first ring outer periphery gear Gr1 |
| Zp2d | Number of teeth of the second motor gear Gm2 |
| Zo | Number of teeth of the second ring outer periphery gear Gr2 |
| Zod | Number of teeth of the output gear 71 |

The control of the engine 21 by the control unit 27 is described in detail below. As described above, the control unit 27 controls the engine 21 by transmitting command signals to the fuel injection device 28. A method for determining the command throttle values for the fuel injection device 28 will be explained below. The control unit 27 has an engine requirement determining unit 87 and a required throttle determining unit 89.

The engine requirement determining unit 87 determines the engine required horsepower Hdm on the basis of the work implement required horsepower Hpto, the transmission required horsepower Htm, and the energy management required horsepower Hem. Specifically, the engine requirement determining unit 87 determines an engine required horsepower Hdm by adding the work implement required horsepower Hpto, the transmission required horsepower Htm, and the energy management required horsepower Hem.

The required throttle determining unit 89 determines a command throttle value Th_cm from the engine required horsepower Hdm and the accelerator operating amount Aac. The required throttle determining unit 89 uses an engine torque line Let and a matching line Lma stored in the storage unit 56 to determine the command throttle value Th_cm. The engine torque line Let defines a relationship between the output torque of the engine 21 and the engine rotation speed Ne. The matching line Lma is information for determining a first required throttle value from the engine required horse power Hdm.

The required throttle determining unit 89 determines the first required throttle value so that the engine torque line Let and the matching line Lma match at a matching point Pma1 where the output torque of the engine 21 becomes the torque corresponding to the engine required horsepower Hdm. The required throttle determining unit 89 determines the lowest value from the first required throttle value and a second required throttle value corresponding to the accelerator operating amount Aac as the command throttle value Th_cm.

As described above, the third motor MG3 is switched between the connected state and the disconnected state in the Lo mode. The third motor MG3 is connected to either of the first motor MG1 or the second motor MG2 in the connected state. The third motor MG3 is disconnected from the first motor MG1 and the second motor MG2 in the disconnected state. The control for the connection and disconnection of the third motor MG3 is explained below.

The Tm1_ref in the following explanation signifies a Tm1_Low in the Lo mode and a Tm1_Hi in the Hi mode. The Tm2_ref in the following explanation signifies a Tm2_Low in the Lo mode and a Tm2_Hi in the Lo mode.

The magnitude correlation of the rotation speed and the torque in the following explanation signifies the magnitude correlation in absolute values. For example, although the rotation speed of the second motor MG2 when the work vehicle 1 is traveling forward is negative when the rotation speed of the first motor MG1 when the work vehicle 1 is traveling forward is positive, the magnitude correlation of the rotation speed of the second motor MG2 signifies a magnitude correlation in the absolute values of the rotation speed of the second motor MG2.

Figure 6:
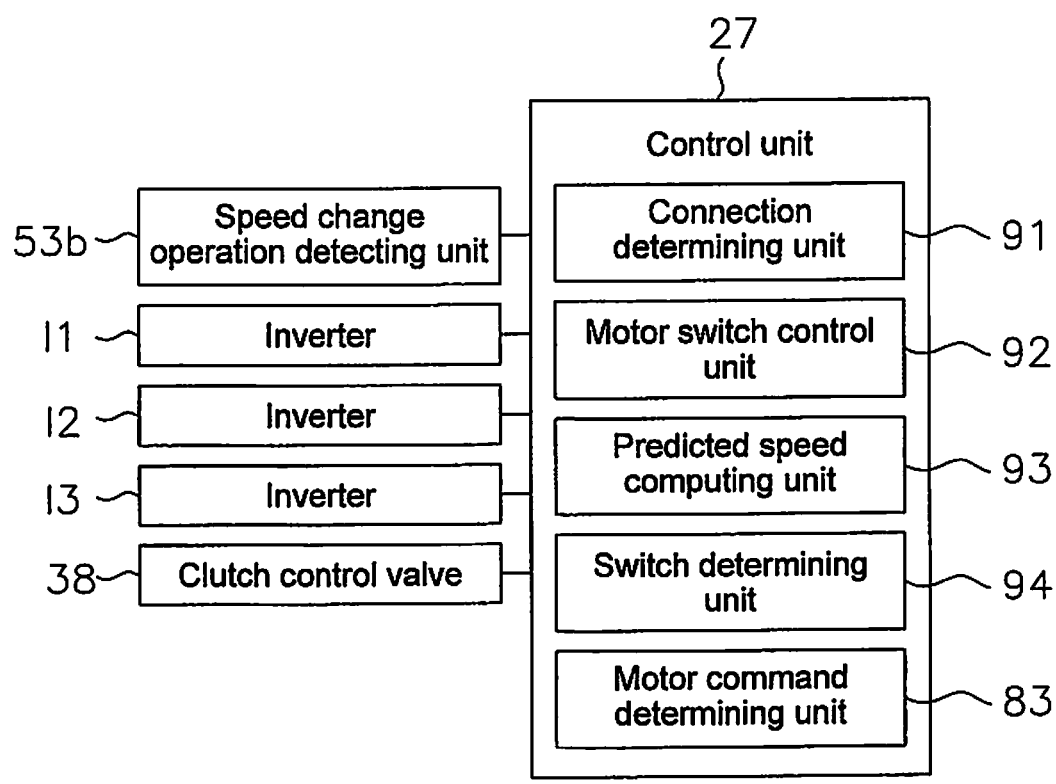
FIG. 6 is a control block diagram illustrating processing executed by the control unit.

As illustrated in FIG. 6, the control unit 27 has a connection determining unit 91, a motor switch control unit 92, and a predicted speed computing unit 93. The connection determining unit 91 determines whether assistance from the third motor MG3 is required or not. That is, the connection determining unit 91 determines whether to switch from the disconnected state to the connected state of the third motor MG3 or whether to switch from the connected state to the disconnected state of the third motor MG3.

Figure 7:
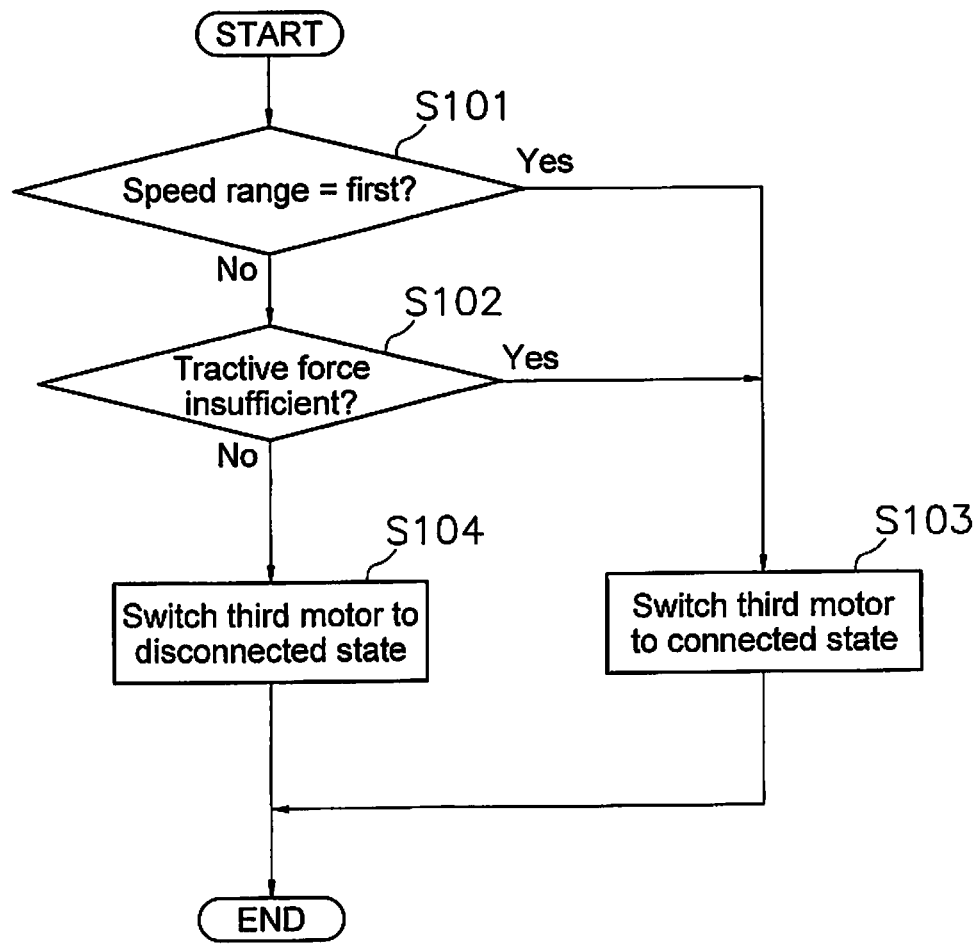
FIG. 7 is a flow chart illustrating processing when the third motor is switched between the disconnected state and the connected state.

First, processing when switching from the disconnected state to the connected state of the third motor MG3 will be explained. FIG. 7 is a flow chart illustrating processing when the third motor MG3 is switched from the disconnected state to the connected state.

As illustrated in FIG. 7, the connection determining unit 91 determines whether the first speed has been selected as the speed range in step S101 (first connection determination condition). The connection determining unit 91 determines whether the first speed has been selected due to a detection signal from the speed change operation detecting unit 53b.

The connection determining unit 91 determines whether the tractive force of the power transmission device 24 obtained from the output torque of the first motor MG1 and the output torque of the second motor MG2 is less than the required tractive force in step S102 (second connection determination condition). That is, the connection determining unit 91 determines in step S102 that the tractive force obtained without assistance from the third motor MG3 is less than the required tractive force.

Figure 8:
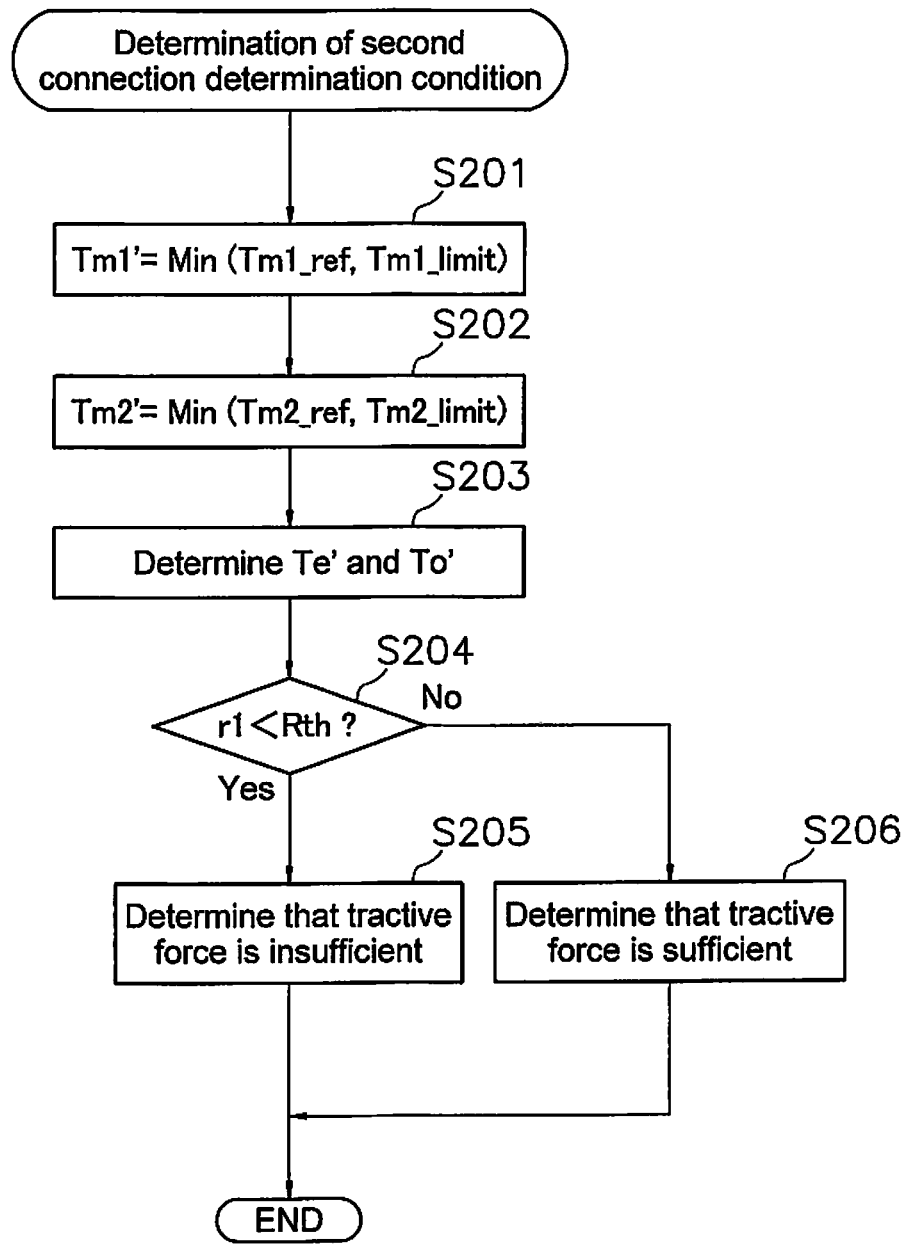
FIG. 8 is a flow chart illustrating a method for determining a second connection determination condition.

FIG. 8 is a flow chart illustrating a method for determining a second connection determination condition. As illustrated in FIG. 8, the connection determining unit 91 compares the command torque Tm1_ref for the first motor MG1 with a motor output limit value Tm1_limit and determines the smaller of the values as Tm1' in step S201. "Min" in FIG. 8 signifies the selection of the smallest value among the inputted numerical values. That is, when Tm1_ref exceeds the motor output limit value Tm1_limit, the motor output limit value Tm1_limit is the upper limit of Tm1'.

The connection determining unit 91 compares the command torque Tm2_ref for the second motor MG2 with a motor output limit value Tm2_limit and determines the smaller of the values as Tm2' in step S202. The motor output limit values Tm1_limit and Tm2_limit are the maximum torques of the respective motors MG1 and MG2 for example. Alternatively, the motor output limit values Tm1_limit and Tm2_limit may be upper limit torques determined in response to the rotation speeds of the motors MG1 and MG2.

The connection determining unit 91 uses the above-mentioned torque-balance information to determine a back-calculated target input shaft torque Te' and a target output shaft torque To' from the Tm1' and Tm2' in step S203. The connection determining unit 91 then compares the target output shaft torque To_ref with the back-calculated target output shaft torque To' to determine whether a ratio r1 of To' with respect to To_ref is less than a predetermined threshold Rth in step S204.

When the ratio r1 is less than the predetermined threshold Rth, the connection determining unit 91 determines in step S205 that the tractive force would be insufficient without the assistance from the third motor MG3. That is, the connection determining unit 91 determines that the second connection determination condition is met. When the ratio r1 is equal to or greater than the predetermined threshold Rth, the connection determining unit 91 determines in step S206 that the tractive force would be sufficient without the assistance from the third motor MG3. That is, the connection determining unit 91 determines that the second connection determination condition is not met.

The threshold Rth is 100%. That is, when To' is less than To_ref, the connection determining unit 91 determines that the second connection determination condition is met. However, the threshold Rth may be a value less than 100%. In this case, although the generation of tractive force is delayed by the connection determination being met due to the tractive force being less than the required tractive force in comparison to when the threshold Rth is 100%, hunting behavior of the connection determination and disconnection determination can be suppressed because hysteresis is provided between the connection determination and the below mentioned disconnection determination.

As illustrated in FIG. 7, when either the first connection determination condition is met in step S101 or the second connection determination condition is met in step S102, the motor switch control unit 92 switches the third motor MG3 to the connected state in step S103. The motor switch control unit 92 connects the third motor MG3 to whichever of the first motor MG1 and the second motor MG2 has the smallest rotation speed. The following explanation discusses a case of connecting the third motor MG3 to the first motor MG1.

When the first connection determination condition is not met in step S101 and the second connection determination condition is not met in step S102, the motor switch control unit 92 maintains the third motor MG3 in the disconnected state in step S104. When the third motor MG3 is in the disconnected state, the motor command determining unit 83 sets the command value of the rotation speed for the third motor MG3 to a predetermined first standby command value (this state is referred to as a "standby state" below). The predetermined first standby command value is zero in the present embodiment. However, a very small value other than zero may bet set as the predetermined first standby command value. The very small value is preferably a torque for assisting a certain rotation to zero rotations when the third motor MG3 is put on standby at zero rotations. For example, the very small value is a torque for preventing rotation of the third motor by canceling out a corotation torque that is transmitted even during the clutch disconnected state.

The motor command determining unit 83 synchronizes the third motor MG3 when the motor switch control unit 92 switches the third motor MG3 from the disconnected state to the connected state. The motor command determining unit 83 decides the command value to the third motor MG3 so that the rotation speed of the third motor MG3 is synchronized with the rotation speed of the motor that the third motor MG3 is connected to among the first motor MG1 and the second motor MG2. That is, the motor command determining unit 83 determines the command torque for the third motor MG3 so that the rotation speed of the third motor MG3 approaches the rotation speed of the first motor MG1. The following explanation discusses synchronization control when connecting the third motor MG3 to the first motor MG1 from the disconnected state.

Figure 9:
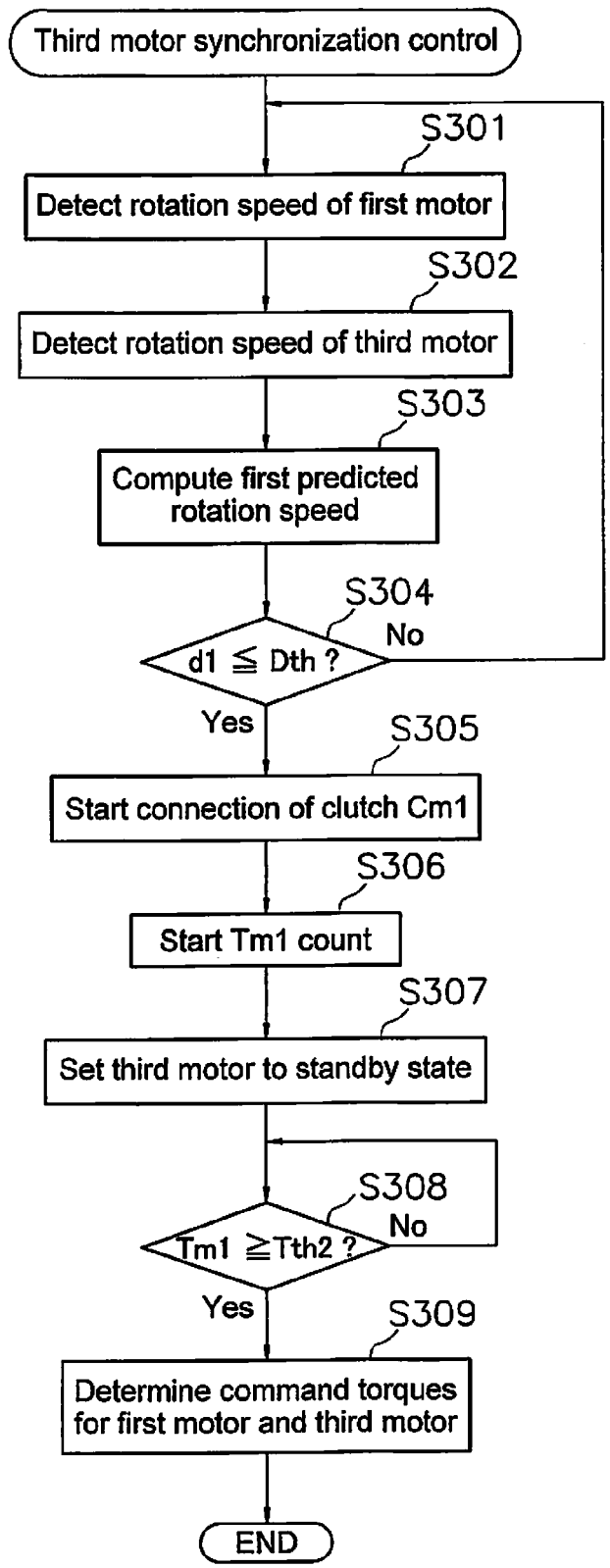
FIG. 9 is a flow chart illustrating processing for controlling synchronization with the third motor.

FIG. 9 is a flow chart of processing for synchronization control of the third motor MG3. As illustrated in FIG. 9, the predicted speed computing unit 93 detects a rotation speed of the first motor MG1 in step S301. The predicted speed computing unit 93 detects a rotation speed of the third motor MG3 in step S302. The predicted speed computing unit 93 detects the rotation speeds of the respective motors MG1 and MG3 on the basis of signals from the inverters I1 and I3.

The predicted speed computing unit 93 computes a first predicted rotation speed in step S303. The first predicted rotation speed is a predicted value of the first rotation speed of the first motor MG1 after a predetermined first predicted time period has elapsed from the current point in time. The first rotation speed is the rotation speed of the first motor MG1 equivalent to the rotating shaft of the third motor MG3. A below-mentioned second rotation speed is the rotation speed of the second motor MG2 equivalent to the rotating shaft of the third motor MG3. The rotation speed equivalent to the rotating shaft of the third motor MG3 signifies the rotation speed when the rotation speed of the first motor MG1 or the second motor MG2 is switched to the rotation speed of the rotating shaft of the third motor MG3.

Figure 10:
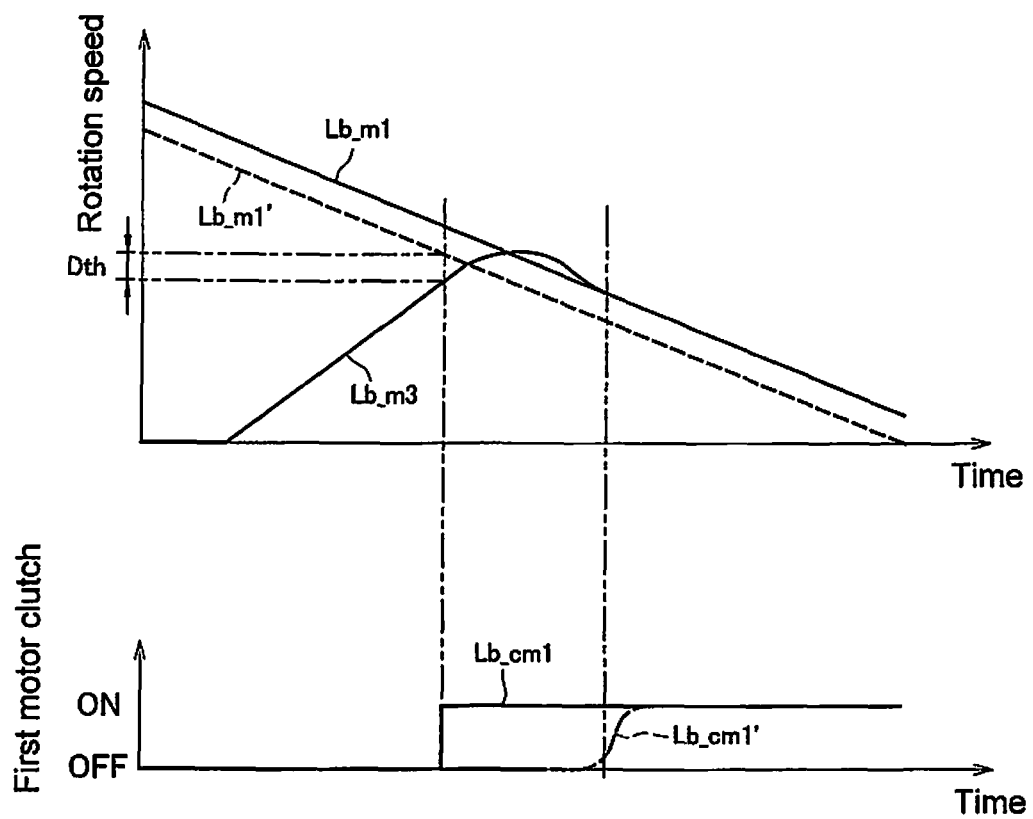
FIG. 10 illustrates changes between a first rotation speed, a first predicted rotation speed, and the rotation speed of the third motor during synchronization control.

FIG. 10 illustrates changes between a first rotation speed, a first predicted rotation speed, and the rotation speed of the third motor MG3 during synchronization control. The predicted speed computing unit 93 records the rotation speed of the first motor MG1 at prescribed time periods and derives a rate of change of the rotation speed from the recorded rotation speeds. The solid line Lb_m1 in FIG. 10 depicts the rate of change of the first rotation speed derived from the recorded rotation speeds of the first motor MG1. The dashed line Lb_m1' depicts the changes of the first predicted rotation speed. The predicted speed computing unit 93 determines the first predicted rotation speed by calculating the rotation speed after a first predicted time period Tth1 has elapsed from the rate of change of the first rotation speed. That is, a plurality of recent recording values among the recorded rotation speeds of the first motor MG1 are derived as the rate of change of the first rotation speed and the first predicted rotation speed is calculated as the continuation of the rate of change during the first predicted time period Tth1. When using an average of the rate of change, the rate of change may also be calculated by adding a weight to the time sequence or by assuming that the amount of change of the rate of change continues. The solid line Lb_m3 in FIG. 10 depicts the change in the rotation speed of the third motor MG3.

FIG. 10 further illustrates the connected (ON) states and the disconnected (OFF) states of the first motor clutch Cm1. The solid line Lb_cm1 in FIG. 10 depicts changes in the command signals to the first motor clutch Cm1. The dashed line Lb_cm1' depicts changes in the actual oil pressure of the first motor clutch Cm1.

As illustrated in FIG. 9, the connection determining unit 91 in step S304 determines whether a difference dl between the first predicted rotation speed and the rotation speed of the third motor MG3 is equal to or less than a predetermined switching threshold Dth. If the difference dl between the first predicted rotation speed and the rotation speed of the third motor MG3 is equal to or less than the predetermined switching threshold Dth, the motor switch control unit 92 starts the connection with the first motor clutch Cm1 in step S305. That is, the motor switch control unit 92 outputs a command signal to the clutch control valve 38 to connect the first motor clutch Cm1.

When the connection with the first motor clutch Cm1 has started, the counting of a timer Tm1 is started in step S306. The motor command determining unit 83 sets the command torque for the third motor MG3 to a predetermined standby command value in step S307.

The connection determining unit 91 determines whether a predetermined second predicted time period Tth2 has elapsed from the connection starting time point with the first motor clutch Cm1 in step S308. When the predetermined second predicted time period Tth2 has not elapsed from the connection starting time point with the first motor clutch Cm1, the motor command determining unit 83 keeps the command torque for the third motor MG3 at the predetermined standby command value. That is, until the predetermined second predicted time period Tth2 elapses from the connection starting time point with the first motor clutch Cm1, the motor command determining unit 83 sets the command torque for the third motor MG3 to the predetermined standby command value.

The standby command value in the present exemplary embodiment is zero but may also be a value other than zero. The second predicted time period Tth2 and the abovementioned first predicted time period Tth1 are for example estimated time periods from the connection starting time point of the first motor clutch Cm1 until the connection is completed. Alternatively, the second predicted time period Tth2 and the first predicted time period Tth1 may be time periods that take into account the time lag for the transmission of the detection signals of the rotation speeds of the first motor MG1 and the third motor MG3 and the command signals for the first motor MG1 and the third motor MG3. The second predicted time period Tth2 and the first predicted time period Tth1 are not necessarily the same value. For example, the second predicted time period Tth2 may be longer than the first predicted time period Tth1.

When the second predicted time period Tth2 from the connection starting time point of the first motor clutch Cm1 has elapsed, the motor command determining unit 83 determines the command torques for the first motor MG1 and the third motor MG3 in step S309. That is, the torque distribution to the third motor MG3 is carried out when the completion of the connection of the third motor MG3 to the first motor MG1 is determined. The method for torque distribution is discussed below.

When the third motor MG3 switches from the standby state to the connected state, the above synchronization control is not carried out if the rotation speed of the third motor MG3 and the rotation speed of the motor that is the connection target of the third motor MG3 are zero. For example, the rotation speed of the second motor MG2 is zero at the switching point (threshold RSth1) between the Lo mode and the Hi mode. As a result, synchronization control is not carried out when the third motor MG3 is connected to the second motor MG2 from the standby state of a rotation speed of zero at the switching point between the Lo mode and the Hi mode.

Figure 11:
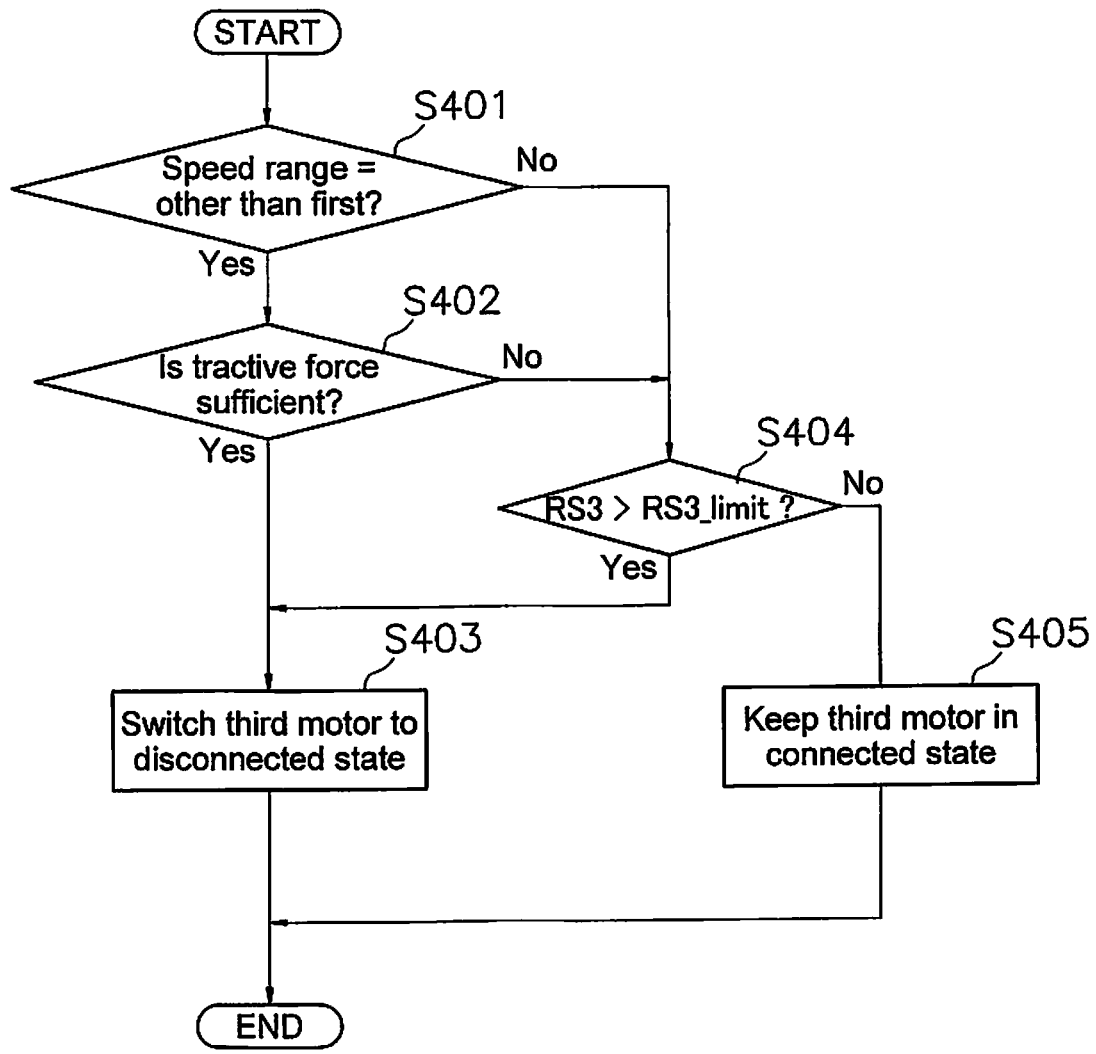
FIG. 11 is a flow chart illustrating processing when the third motor is switched from the connected state to the disconnected state.

Next, processing when switching from the connected state to the disconnected state of the third motor MG3 will be explained. FIG. 11 is a flow chart illustrating processing when the third motor MG3 is switched from the connected state to the disconnected state.

The connection determining unit 91 determines in step S401 whether a speed range other than the first speed has been selected (first disconnection determination condition). The connection determining unit 91 determines whether a speed range other than the first speed has been selected due to a detection signal from the speed change operation detecting unit 53b.

The connection determining unit 91 determines in S402 whether the tractive force of the power transmission device 24 obtained from the output torque of the first motor MG1 and the output torque of the second motor MG2 is sufficient with respect to the required tractive force in step S402 (second disconnection determination condition). The connection determining unit 91 at this time determines the second disconnection determination condition with the same method as for the second connection determination condition described above with regard to FIG. 8. However, the Rth of the second disconnection determination condition may be different from the Rth of the connection determination condition. The Rth of the disconnection determination condition is preferably 100%. A drop in the tractive force at the time of disconnection can be prevented by making the Rth of the disconnection determination condition 100%.

When either the first disconnection determination condition is met in step S401 or the second dis connection determination condition is met in step S402, the motor switch control unit 92 sets the third motor MG3 to the disconnected state in step S403. When the third motor MG3 is in the disconnected state, the motor command determining unit 83 sets the third motor MG3 to the standby state.

The connection determining unit 91 determines in step S404 whether the rotation speed RS3 of the third motor MG3 is larger than a predetermined upper limit RS3_limit (third disconnection determination condition). When the rotation speed of the third motor MG3 is larger than the predetermined upper limit RS3_limit, the motor switch control unit 92 sets the third motor MG3 to the disconnected state in step S403. That is, either when either the first disconnection determination condition is met in step S401 and the second disconnection determination condition is met in step S402, or when the third disconnection determination condition is met in step S404, the motor switch control unit 92 sets the third motor MG3 to the disconnected state.

When either the first disconnection determination condition in step S401 or the second disconnection determination condition in step S402 is not met, and the third disconnection determination condition is not met in step S404, the motor switch control unit 92 keeps the third motor MG3 to the connected state.

Even when the above-mentioned connection determination conditions are met, when the first rotation speed of the third motor MG3 after being connected to the first motor MG1 exceeds a predetermined upper rotation speed, the third motor MG3 may be set to a standby state with the command value for the third motor MG3 acting as the second standby command value. The second standby command value is equal to or lower than the predetermined upper rotation speed. The second standby command value may be larger than the above-mentioned first standby command value. The predetermined upper rotation speed is preferably equal to or less than the above-mentioned predetermined upper limit RS3_limit of the third disconnection determination condition. The predetermined upper rotation speed is more preferably less than the predetermined upper limit RS3_limit.

Even when the third motor MG3 is switched to the disconnected state when the first rotation speed exceeds the predetermined upper limit RS3_limit while the third motor MG3 is connected, the third motor MG3 is set to the standby state with the command value of the rotation speed of the third motor MG3 acting as the second standby command value while the connection determination condition continues to be met.

In these cases, the third motor MG3 can be connected more quickly and the required tractive force can be generated quickly when the first rotation speed falls from the high rotation speed during excavation and the like by causing the third motor MG3 to wait with the second standby command value. Even when the above-mentioned condition for causing the third motor MG3 to wait with the second standby command value is met, when the percentage of the speed ratio with respect to the threshold RSth1 for switching between the Lo mode and the Hi mode is equal to or greater than a predetermined percentage, the command value of the rotation speed for the third motor MG3 may be set to the first standby command value. That is, when the speed ratio in the Lo mode approaches the threshold RSth1 for switching between the Lo mode and the Hi mode and the speed ratio is equal to or greater than a predetermined ratio with respect to the threshold RSth1, the command value of the rotation speed to the third motor MG3 is changed to the first standby command value. Consequently, the Lo mode is switched to the Hi mode and the third motor MG3 can be caused to wait with the first standby command value.

Control of the connection and disconnection between the third motor MG3 and the first motor MG1 has been discussed above, and the control of the connection and disconnection between the third motor MG3 and the second motor MG2 is the same.

The third motor MG3 is always connected to either of the first motor MG1 and the second motor MG2 in the Hi mode. In this case, the connection target of the third motor MG3 is switched between the first motor MG1 and the second motor MG2. The switching control for the connection target of the third motor MG3 is explained below.

As illustrated in FIG. 6, the control unit 27 has a switch determining unit 94. The switch determining unit 94 determines the switching of the motor that is the connection target of the third motor MG3. The switch determining unit 94 connects the third motor MG3 to the motor having the lowest rotation speed among the first motor MG1 and the second motor MG2. Specifically, when the first rotation speed is less than the second rotation speed, the switch determining unit 94 connects the third motor MG3 to the first motor MG1. When the second rotation speed is less than the first rotation speed, the switch determining unit 94 connects the third motor MG3 to the second motor MG2.

Figure 12:
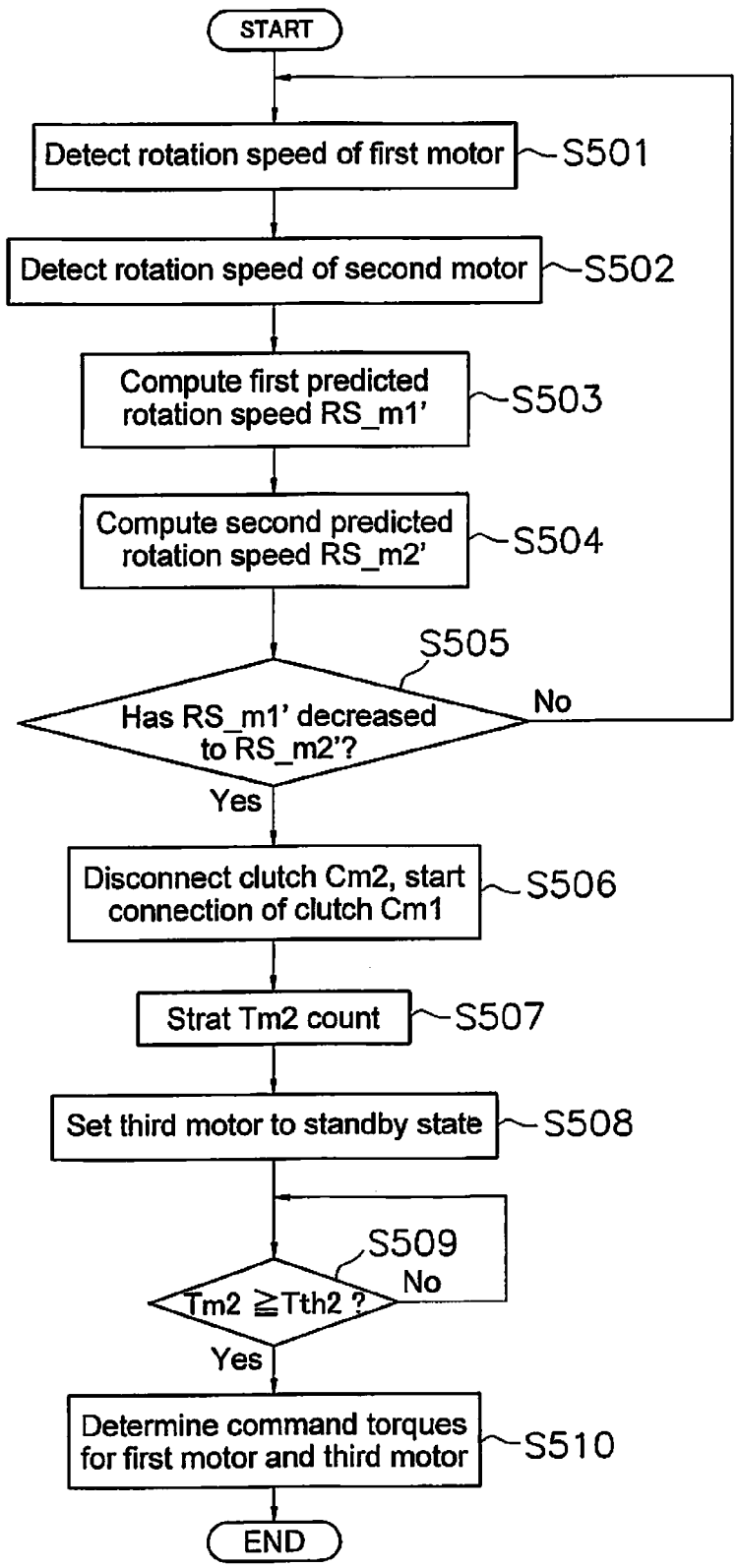
FIG. 12 is a flow chart illustrating processing when the connection target of the third motor is switched from the second motor to the first motor.

FIG. 12 is a flow chart illustrating processing when the connection target of the third motor MG3 is switched from the second motor MG2 to the first motor MG1. As illustrated in FIG. 12, the predicted speed computing unit 93 detects the rotation speed of the first motor MG1 in step S501. The predicted speed computing unit 93 detects the rotation speed of the second motor MG2 in step S502. The predicted speed computing unit 93 detects the rotation speeds of the respective motors MG1 and MG2 on the basis of signals from the inverters I1 and I2. The rotation speeds of the motors MG1 and MG2 may be detected by signals from a sensor for detecting the rotation speeds of the motors MG1 and MG2.

The predicted speed computing unit 93 computes a first predicted rotation speed RS_m1' in step S503. The predicted speed computing unit 93 computes a second predicted rotation speed RS_m2' in step S504. The first predicted rotation speed RS_m1' is a predicted value of the rotation speed of the first motor MG1 after the predetermined first predicted time' period Tth1 has elapsed from the current point in time. The second predicted rotation speed RS_m2' is a predicted value of the rotation speed of the second motor MG2 after the predetermined first predicted time period Tth1 has elapsed from the current point in time. The predicted speed computing unit 93 computes the first predicted rotation speed RS_m1' and the second predicted rotation speed RS_m2' using the same method as in step S303 for the above-mentioned synchronization control.

Figure 13:
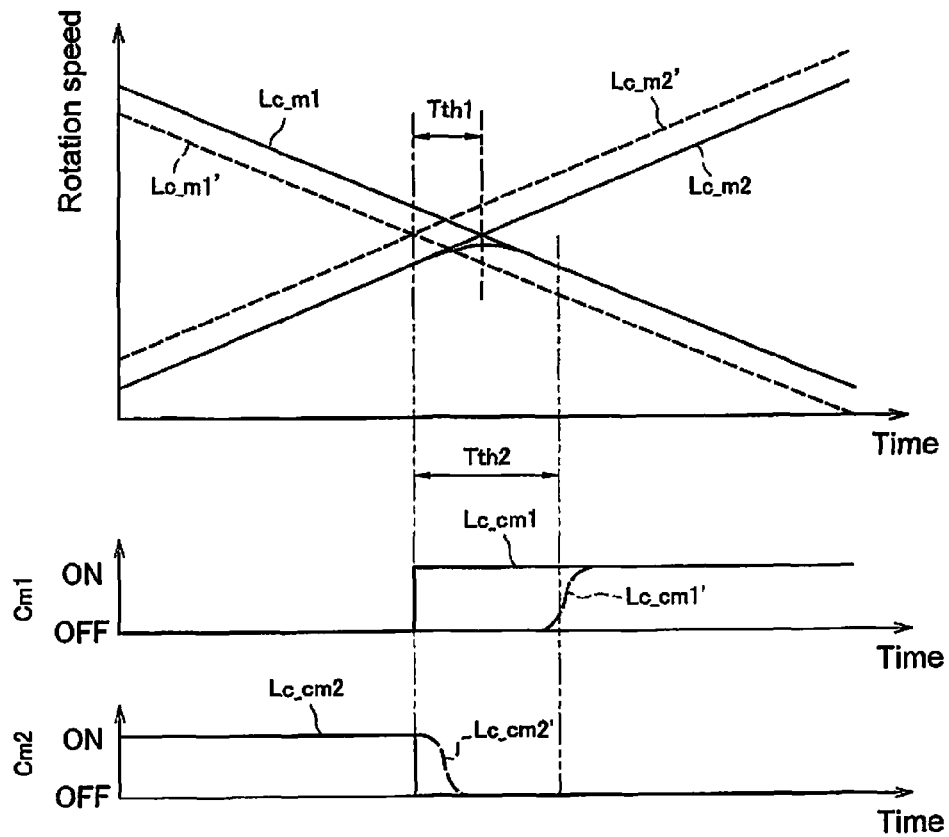
FIG. 13 illustrates changes between the first rotation speed and the second rotation speed during switching control.

FIG. 13 illustrates changes between the first rotation speed and second rotation speed during switching control. The solid line Lc_m1 in FIG. 13 depicts the rate of change of the first rotation speed derived from the recorded rotation speeds. The dashed line Lc_m P depicts the changes of the first predicted rotation speed RS_m1'. The solid line Lc_m2 depicts the rate of change of the second rotation speed derived from the recorded rotation speeds. The dashed line Lc_m2' depicts the changes of the second predicted rotation speed RS_m2'.

Figure 14:
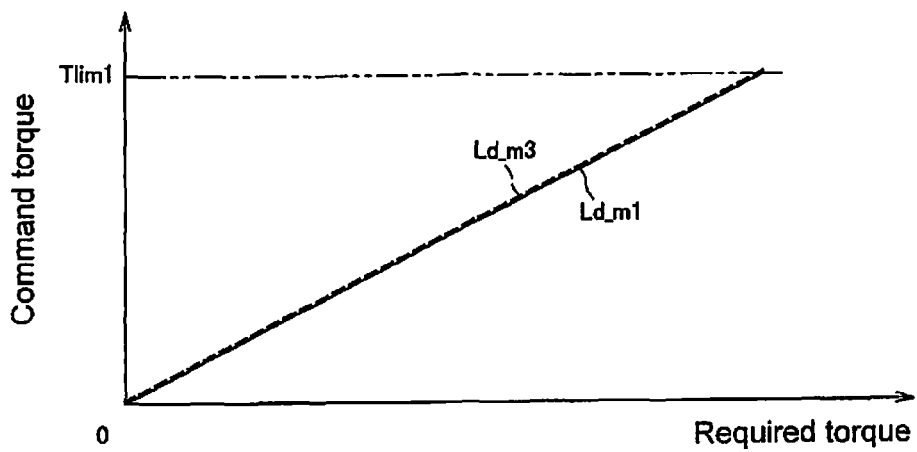
FIG. 14 illustrates distribution of the command torques to the first motor and the third motor with respect to the required torque.

FIG. 13 further illustrates the connected (ON) states and the disconnected (OFF) states of the first motor clutch Cm1 and the second motor clutch Cm2. The solid line Lc_cm1 in FIG. 14 depicts changes in the command signals to the first motor clutch Cm1. The dashed line Lc_cm1' depicts changes in the actual oil pressure of the first motor clutch Cm1. The solid line Lc_cm2 depicts changes in the command signals to the second motor clutch Cm2. The dashed line Lc_cm2' depicts changes in the actual oil pressure of the second motor clutch Cm2.

The switch determining unit 94 determines in step S505 in FIG. 12 whether the first predicted rotation speed RS_m1' has decreased from a value larger than the second predicted rotation speed RS_m2' to the second predicted rotation speed RS_m2'. When the dashed line Lc_m1' intersects with the dashed line Lc_m2' in FIG. 13, it is determined that the first predicted rotation speed RS_m1' has decreased from a value larger than the second predicted rotation speed RS_m2' to the second predicted rotation speed RS_m2'.

When the first predicted rotation speed RS_m1' decreases from a value larger than the second predicted rotation speed RS_m2' to the second predicted rotation speed RS_m2', the motor switch control unit 92 controls the motor switching mechanism 73 to switch the connection target of the third motor MG3 from the second motor MG2 to the first motor MG1 in step S506. That is, the motor switch control unit 92 connects the first motor clutch Cm1 and disconnects the second motor clutch Cm2.

When the connection with the first motor clutch Cm1 has started, the counting of a timer Tm2 is started in step S507. The motor command determining unit 83 sets the command torque for the third motor MG3 to the predetermined standby command value in step S508. As a result, the third motor MG3 is set to the standby state. That is, the third motor MG3 is set to the standby state at the point in time that the connection of the first motor clutch Cm1 and the disconnection of the second motor clutch Cm2 have started. The point in time is not limited to the point in time that the connection of the first motor clutch Cm1 and the disconnection of the second motor clutch Cm2 have started, and the third motor MG3 may be switched to the standby state quickly thereafter.

Next, the switch determining unit 94 determines whether a predetermined second predicted time period Tth2 has elapsed from the connection starting time point with the first motor clutch Cm1 in step S509. When the predetermined second predicted time period Tth2 has not elapsed from the connection starting time point with the first motor clutch Cm1, the motor command determining unit 83 keeps the command torque for the third motor MG3 at the predetermined standby command value. That is, until the predetermined second predicted time period Tth2 elapses from the connection starting time point with the first motor clutch Cm1, the motor command determining unit 83 sets the command torque for the third motor MG3 to the predetermined standby command value.

When the second predicted time period Tth2 from the connection starting time point of the first motor clutch Cm1 has elapsed, the motor command determining unit 83 determines the command torques for the first motor MG1 and the third motor MG3 in step S510. That is, the torque distribution to the third motor MG3 is carried out when the completion of the connection of the third motor MG3 to the first motor MG1 is determined. The method for torque distribution is discussed below.

While the control for switching the connection target of the third motor MG3 from the second motor MG2 to the first motor MG1 has been discussed above, the control for switching the connection target of the third motor MG3 from the first motor MG1 to the second motor MG2 is the same. That is, when the second predicted rotation speed RS_m2' decreases from a value larger than the first predicted rotation speed RS_m1' to the first predicted rotation speed RS_m1', the motor switch control unit 92 controls the motor switching mechanism 73 to switch the connection target of the third motor MG3 from the first motor MG1 to the second motor MG2. The motor command determining unit 83 sets the command torque to the third motor MG3 to the predetermined standby command value in a period from point in time when the second predicted rotation speed reaches the first predicted rotation speed until a third predicted time period has elapsed. The third predicted time period in the present exemplary embodiment may be the same value as the second predicted time period, or may be a different value.

Next, the processing for torque distribution to the third motor MG3 is discussed.

When the third motor MG3 is connected to the first motor MG1, the motor command determining unit 83 distributes a portion of the above-mentioned Tm1_ref to the third motor MG3 while Tm1_ref is considered as a required torque for the third motor MG3 and the first motor MG1. When the third motor MG3 is connected to the second motor MG2, the motor command determining unit 83 distributes a portion of the abovementioned Tm2_ref to the third motor MG3 while Tm2_ref is considered as a required torque for the third motor MG3 and the second motor MG2. Hereinbelow, processing when the third motor MG3 is connected to the first motor MG1 and the Tm1_ref is distributed to the first motor MG1 and the third motor MG3 will be discussed.

FIG. 14 illustrates command torques for the motors with respect to the required torque. The solid line Ld_m1 in FIG.

14 depicts the command torque to the first motor MG1 with respect to the required torque. The dashed line Ld_m3 depicts the command torque to the third motor MG3 with respect to the required torque. As illustrated in FIG. 14, the motor command determining unit 83 determines the command torques to the first motor MG1 and the third motor MG3 so that the command torque to the third motor MG3 and the command torque to the first motor MG1 are the same. While the solid line Ld_m1 and the dashed line Ld_m3 are depicted as slightly away from each other for ease of understanding in FIG. 14, the solid line Ld_m1 and the dashed line Ld_m3 match each other precisely.

In this case, the command torque Tm1 to the first motor MG1 and the command torque Tm3 to the third motor MG3 are expressed as in the following equation 3.

$$Tm1 = Tm3 = Tm1\_ref/(1+r) \quad \text{Equation 3}$$

Here, r is an acceleration ratio of the third motor MG3 with respect to the first motor MG1. That is, the rotation speed of the third motor MG3 is r times the rotation speed of the first motor MG1. The torque of the third motor MG3 is multiplied by r and transmitted to the rotating shaft of the first motor MG1. When r is greater than 1, the torque of the third motor MG3 is multiplied by r and assists the first motor MG1 so that the size of the motors can be further reduced.

While the processing for distributing the Tm1_ref to the first motor MG1 and the third motor MG3 has been explained above, the processing the distribute the Tm2_ref to the second motor MG2 and the third motor MG3 is the same.

According to the third equation, the torque is distributed evenly between the command torque Tm1 to the first motor MG1 and the command torque Tm3 to the third motor MG3. However, when there is a difference in the rotation speeds of the first motor MG1 and the third motor MG3, the torque may be distributed in a biased manner from the equal distribution. For example, when the relationship between a rotation speed Nm1 of the first motor MG1 and a rotation speed Nm3 of the third motor MG3 is |Nm1|<|Nm3|, the relationship between the torques may be |Tm1|>|Tm3|. When the torques are the same in electrical motor/generators, the one with the highest rotation speed exhibits the highest electrical load. Therefore as described above, by distributing the torques so that the command torque to the motor with the highest rotation speed is reduced, the electrical load on the motor with the highest rotation speed can be reduced and durability can be improved.

Figure 15:
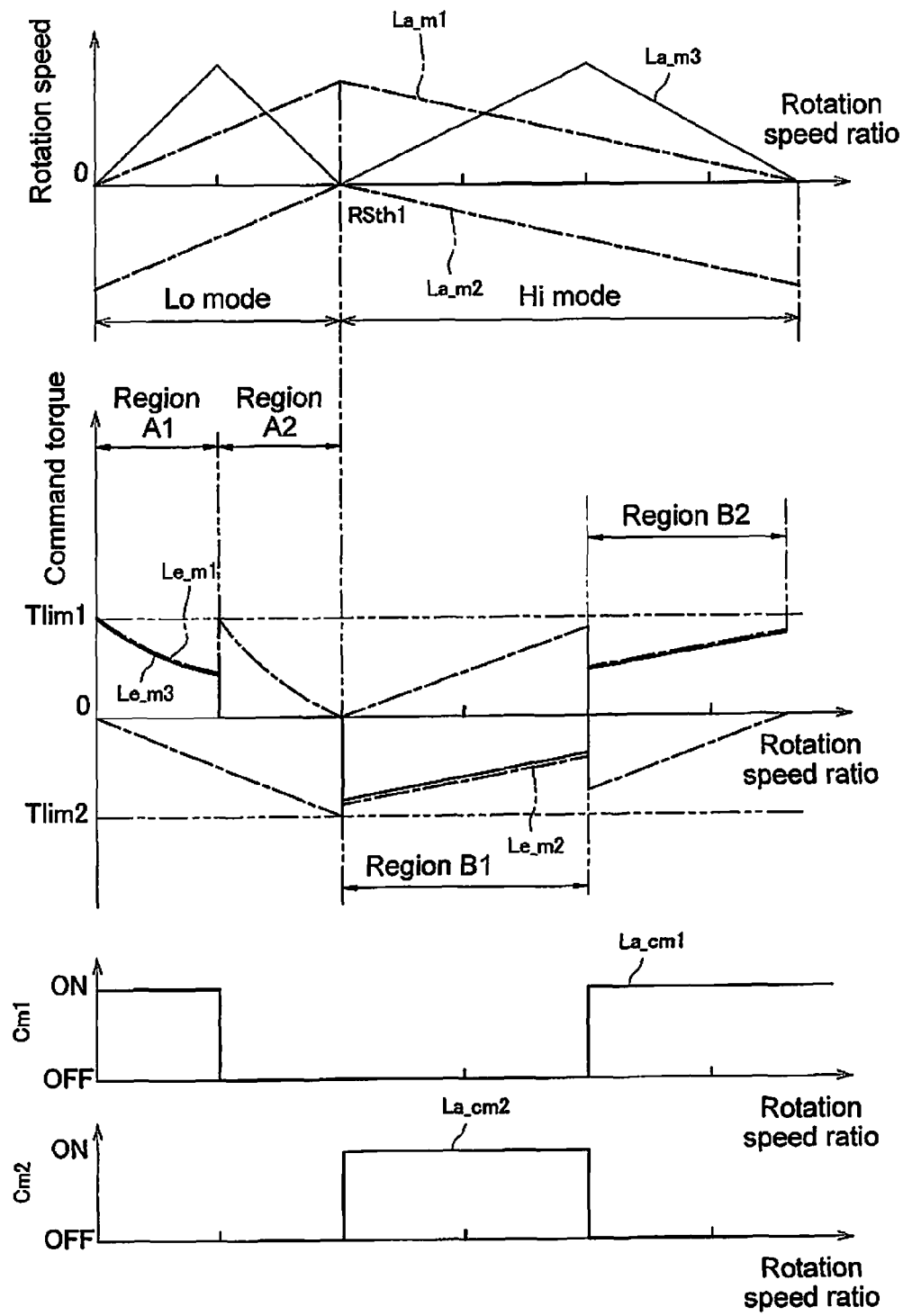
FIG. 15 illustrates changes in rotation speeds and command torques for the first motor, the second motor, and the third motor in the present embodiment.

FIG. 15 illustrates changes in the rotation speeds of the first motor MG1, the second motor MG2, and the third motor MG3 with respect to the rotation speed ratio in the present exemplary embodiment. The long dashed short dashed line La_m1 in FIG. 15 depicts the rotation speed of the first motor MG1, and the long dashed short dashed line La_m2 depicts the rotation speed of the second motor MG2 in the same way as in FIG. 4. The solid line La_m3 depicts the rotation speed of the third motor MG3. The third motor MG3 is only connected to the first motor MG1 in the Lo mode and is not connected to the second motor MG2 and is set to the disconnected state even when the rotation speed of the second motor MG2 is less than the first motor MG1.

FIG. 15 further illustrates changes in the command torques to the motors MG1, MG2, and MG3 when the above-mentioned torque distribution is carried out. The long dashed short dashed line Le_m1 in FIG. 15 depicts the command torque of the first motor MG1, and the long dashed short dashed line Le_m2 depicts the command torque of the second motor MG2. The solid line Le_m3 depicts the command torque of the third motor MG3. FIG. 15 illustrates changes of the connected (ON) states and the disconnected (OFF) states of the first motor clutch Cm1 and the second motor clutch Cm2. The solid line La_cm1 in FIG. 15 depicts changes in the command signals to the first motor clutch Cm1 in the same way as in FIG. 4. The solid line La_cm2 depicts changes in the command signals to the second motor clutch Cm2.

Figure 16:
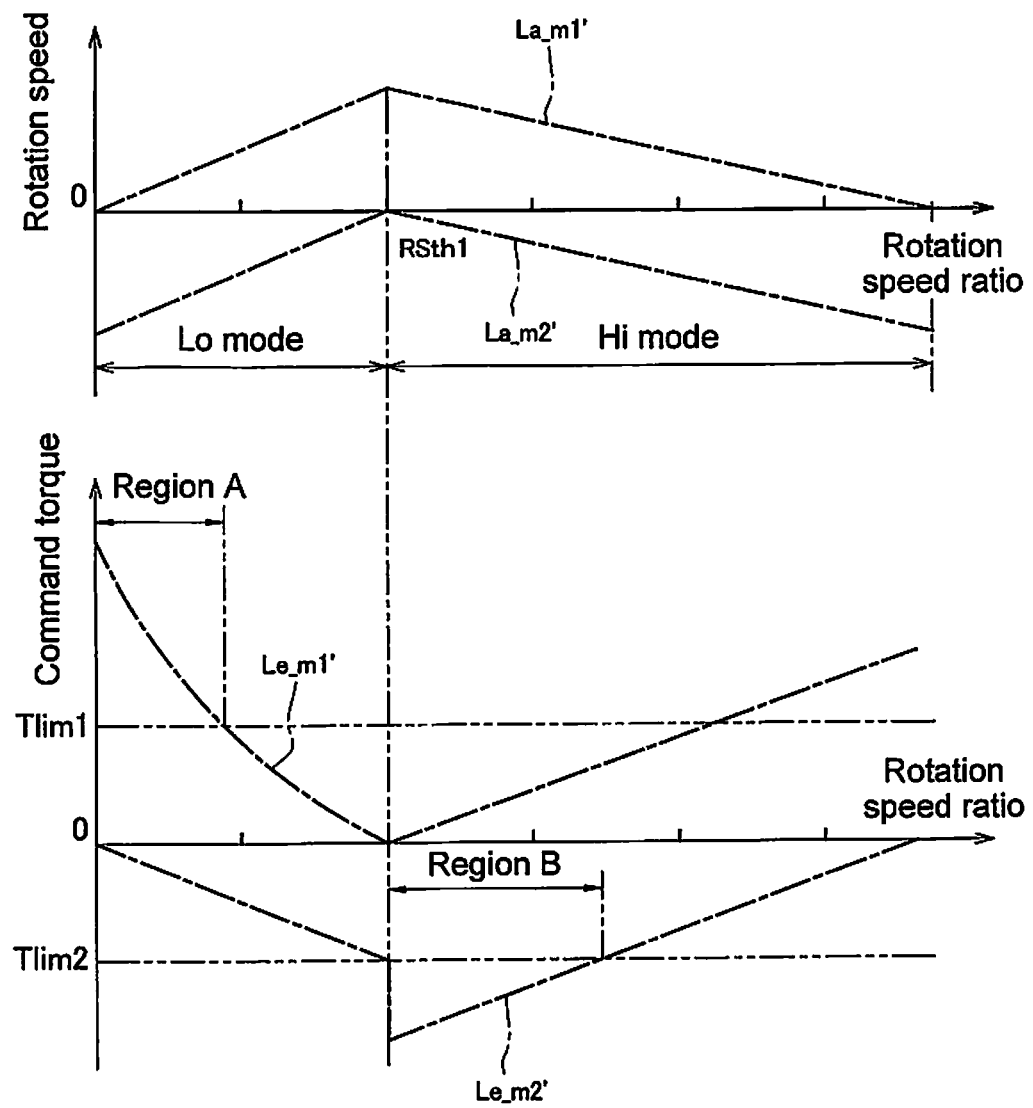
FIG. 16 illustrates changes in rotation speeds and command torques of the first motor and the second motor with respect to the vehicle speed ratio in a comparative example.

FIG. 16 illustrates changes in rotation speeds of the first motor MG1 and the second motor MG2 with respect to the vehicle speed ratio in a comparative example. Assistance by the third motor MG3 is not carried out in the comparative example. The long dashed short dashed line La_m1' in FIG. 16 depicts the rotation speed of the first motor MG1 in the comparative example, and the long dashed short dashed line La_m2' depicts the rotation speed of the second motor MG2 in the comparative example. FIG. 16 further illustrates changes in the command torques for the motors MG1 and MG2 in the comparative example. The long dashed short dashed line Lem1' in FIG. 16 depicts the command torque of the first motor MG1, and the long dashed short dashed line Le_m2' depicts the command torque of the second motor MG2.

As illustrated in FIG. 16, the torques of the motors increase when the rotation speeds of the motors decrease. As a result, when the rotation speed of the first motor MG1 becomes a small value approaching zero in the comparative example as illustrated in FIG. 16 (region A), the command torque to the first motor MG1 exceeds a boundary torque Tlim1. When the rotation speed of the second motor MG2 becomes a small value approaching zero (region B), the command torque to the second motor MG2 exceeds a boundary torque Tlim2.

Conversely as illustrated in FIG. 15, when the rotation speed of the first motor MG1 is less than the rotation speed of the second motor MG2 in the Lo mode in the present exemplary embodiment (region A1), the third motor MG3 is connected to the first motor MG1 and the required torque is evenly distributed between the first motor MG1 and the third motor MG3. As a result, the command torque for the first motor MG1 and the command torque for the third motor MG3 are set so as not to exceed the boundary torque Tlim1.

Even if the rotation speed of the second motor MG2 is less than the rotation speed of the first motor MG1 in the Lo mode (region A2), the third motor MG3 is not connected to the second motor MG2 and is set to the standby state. However even in this case, the required torque for the second motor MG2 does not exceed the boundary torque Tlim2 and thus the command torque for the second motor MG2 does not exceed the boundary torque Tlim2.

When the rotation speed of the second motor MG2 is less than the rotation speed of the first motor MG1 in the Hi mode (region B1), the third motor MG3 is connected to the second motor MG2 and the required torque is evenly distributed between the second motor MG2 and the third motor MG3. As a result, the command torque for the second motor MG2 and the command torque for the third motor MG3 are set so as not to exceed the boundary torque Tlim2.

When the rotation speed of the first motor MG1 is less than the rotation speed of the second motor MG2 in the Hi mode (region B2), the third motor MG3 is connected to the first motor MG1 and the required torque is evenly distributed between the first motor MG1 and the third motor MG3. As a result, the command torque for the first motor MG1 and the command torque for the third motor MG3 are set so as not to exceed the boundary torque Tlim1.

The work vehicle according to the present exemplary embodiment has the following features.

The third motor MG3 assists the first motor MG1 and the second motor MG2 having the lowest rotation speed. That is, the third motor MG3 assists the motor that requires a large torque because the motor with the lowest rotation speed requires a larger torque. As a result, the maximum torque required by the first motor MG1 and the second motor MG2 can be reduced and thus the sizes of the first motor MG1 and the second motor MG2 can be reduced.

Moreover, a command torque to the third motor MG3 is determined as a value that is equal to the command torque to the motor connected to the third motor MG3. As a result, the output torque to the first motor MG1 and the second motor MG2 can be reduced. As a result, the sizes of the first motor MG1 and the second motor MG2 may be reduced. Wear of the components for transmitting the output torque to the first motor MG1 and the second motor MG2 in the power transmission device 24 and the deterioration of the electrical components such as the inverters I1 to I3 can be suppressed.

In this case, the switching of the connection target of the third motor MG3 is determined with the first predicted rotation speed and the second predicted rotation speed. As a result, the connection target of the third motor MG3 can be switched at a timing when the first rotation speed of the first motor MG1 and the second rotation speed of the second motor MG2 approach each other in consideration of the time required for switching the first clutch Cm1 and the second clutch Cm2.

As a result, the command torque for the third motor MG3 becomes the predetermined standby command value until the switching of the first motor clutch Cm1 and the second motor clutch Cm2 is completed. As a result, multiple changes of the torque distribution state and multiple sudden changes in the torques of the first motor MG1, the second motor MG2, and the third motor MG3 can be prevented in the period until the switching of the first motor clutch Cm1 and the second motor clutch Cm2 is completed. Consequently, the generation of shocks in the vehicle body by fluctuation of the tractive force can be prevented.

Although an exemplary embodiment of the present invention has been described so far, the present invention is not limited to the above exemplary embodiments and various modifications may be made within the scope of the invention.

The present invention may be applicable to another type of speed change device, such as an HMT, without being limited to the EMT. In this case, the first motor MG1, the second motor MG2 and the third motor MG3 function as hydraulic motors and hydraulic pumps. The first motor MG1, the second motor MG2, and the third motor MG3 are variable capacitor pump/motors, and the capacities are controlled by the control unit 27.

While the first motor MG1 and the second motor MG2 in the above exemplary embodiment are examples of the first motor and the second motor of the present invention, the example of the first motor of the present invention being the first motor MG1, and the example of the second motor of the present invention being the second motor MG2 is not limited as such and the example of the first motor of the present invention may be the second motor MG2, and the example of the second motor of the present invention may be the first motor MG1.

The configuration of the power transmission device 24 is not limited to the configuration of the above exemplary embodiments. For example, the coupling and disposition of the elements of the two planetary gear mechanisms 68 and 69 are not limited to the coupling and disposition of the above exemplary embodiments. The number of planetary gear mechanisms is not limited to two. For example, the power transmission device 24 may only have one planetary gear mechanism.

While the switching of the connection target of the third motor MG3 is determined based on the first predicted rotation speed and the second predicted rotation speed in the above embodiment, the switching of the connection target of the third motor MG3 may be determined based on the first rotation speed and the second rotation speed.

The third motor MG3 may be connected to the second motor MG2 in the Lo mode. The third motor MG3 may be constantly connected to either of the first motor MG1 or the second motor MG2 in the Lo mode.

Figure 17:
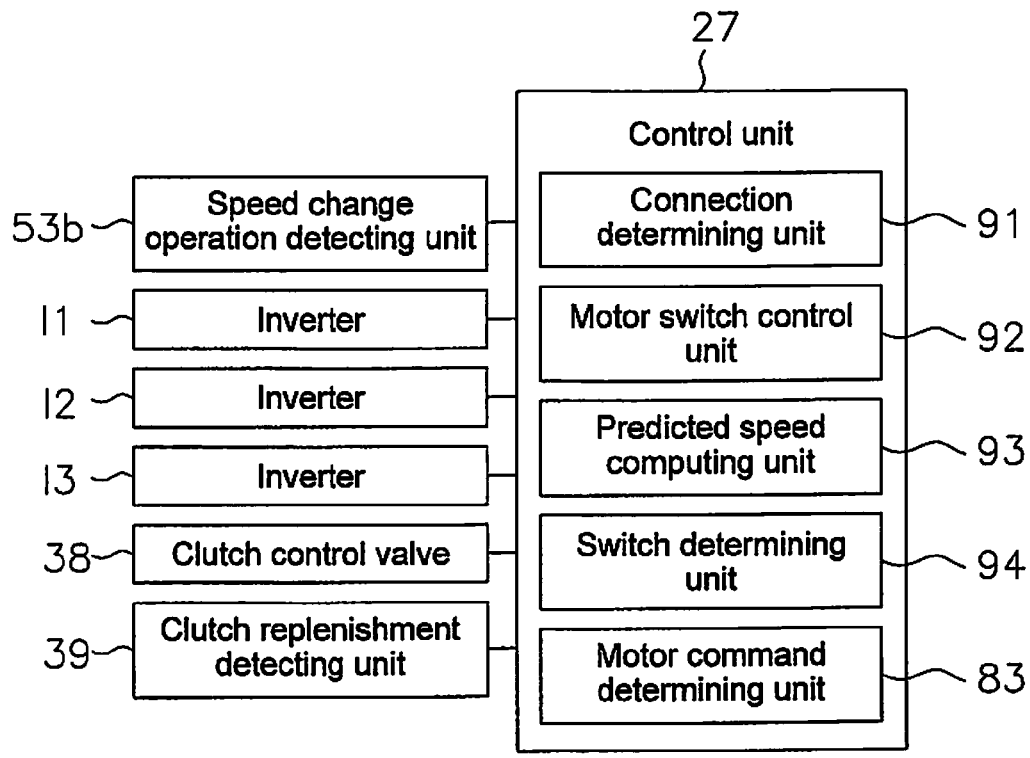
FIG. 17 is a control block diagram illustrating processing executed by the control unit according to another embodiment.

While the connection determining unit 91 and the switch determining unit 94 estimate the timings when the connections of the first motor clutch Cm1 or the second motor clutch Cm2 are completed based on the second predicted time period Tth2 in the above embodiment, the completion of the connection of the first motor clutch Cm1 or the second motor clutch Cm2 may be determined based on a detection signal from a clutch replenishment detecting unit 39 illustrated in FIG. 17. The clutch replenishment detecting unit 39 detects when the replenishment of hydraulic fluid discharged from the clutch control valve 38 to the first motor clutch Cm1 and the second motor clutch Cm2 is completed. The clutch replenishment detecting unit 39 is, for example, a switch that reacts to an action of a clutch plate provided in the motor clutches Cm1 or Cm2. Alternatively, the clutch replenishment detecting unit 39 may be a pressure sensor or a pressure switch for detecting the oil pressure of the motor clutches Cm1 and Cm2.

The command torque for the third motor MG3 is set so as to have the same command torque as the motor that is the connection target of the third motor MG3, for example, the first motor MG1, during the torque distribution to the third motor MG3 in the above exemplary embodiment. However, the motor command determining unit 83 may determine the command torques to the first motor MG1 and the third motor MG3 so that the command torque to the third motor MG3 is equal to or less than the command torque to the first motor MG1, and the torque distribution to the third motor MG3 is not limited to the method of the above exemplary embodiment. When r is greater than 1 (r>1), the rotation speed of the third motor MG3 is r times the rotation speed of the first motor MG1. In this case, because the rotation speed of the third motor MG3 is high when the torques are the same, the load on the third motor MG3 is high. Therefore, the torque of the third motor MG3 is preferably equal to or less than that of the first motor MG1 in order to level the loads on the motors and to equalize the endurance time.

Figure 18:
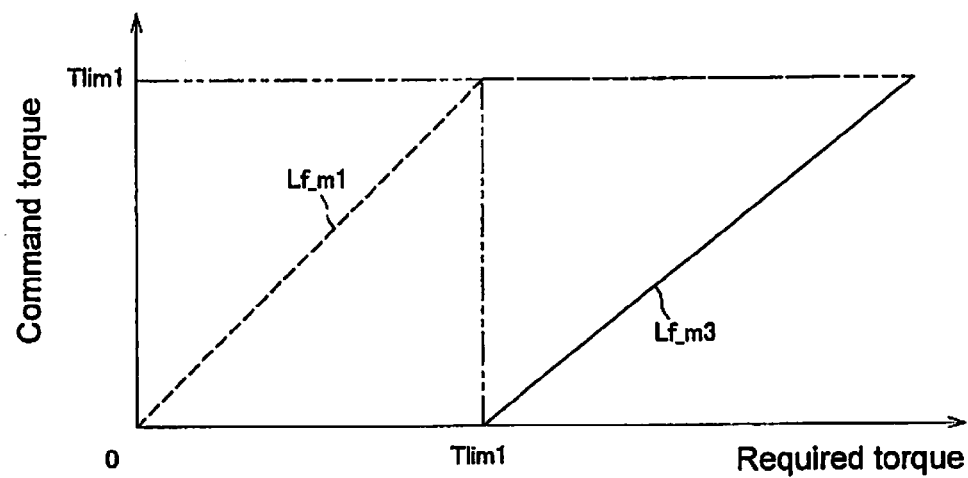
FIG. 18 illustrates distribution of the command torques for the first motor and the third motor according to a first modified example.

For example, FIG. 18 illustrates a torque distribution to the third motor MG3 according to a first modified example. FIG. 18 illustrates a command torque for the first motor MG1 and a command torque for the third motor MG3 with respect to the required torque when the third motor MG3 is connected to the first motor MG1. The dashed line Lf_m1 in FIG. 18 depicts the command torque to the first motor MG1 with respect to the required torque. The solid line Lf_m3 depicts the command torque to the third motor MG3 with respect to the required torque.

As illustrated in FIG. 18, when the required torque is equal to or less than the predetermined boundary torque Tlim1, the motor command determining unit 83 determines the required torque as the command torque for the first motor MG1 and sets the command torque for the third motor MG3 to the predetermined standby command value (zero in the present modified example). When the required torque is greater than the predetermined boundary torque Tlim1, the boundary torque Tlim1 is determined as the command torque of the first motor MG1 and the difference between the required torque and the boundary torque Tlim1 is determined as the command torque of the third motor MG3. In this case, the command torque Tm1 for the first motor MG1 and the command torque Tm3 for the third motor MG3 are expressed as in the following equation 4.

When $Tm1\_ref \leq Tlim1$:

$Tm1 = Tm1\_ref$ $Tm3 = 0$

When $Tm1\_ref > Tlim1$:

$Tm1 = Tlim1$ $Tm3 = (Tm1\_ref - Tlim1)/r$      Equation 4

When the required torque is greater than the predetermined boundary torque Tlim1 in the torque distribution method for the third motor MG3 according to the first modified example, the first motor MG1 can be assisted by the third motor MG3. When the required torque is equal to or less than the predetermined boundary torque Tlim1, the generation of shock can be suppressed even lithe connection with the third motor MG3 is switched because the predetermined standby command value is the command torque of the third motor MG3. When the third motor MG3 is connected to the second motor MG2, the command torque for the second motor MG2 is determined in the same way as the command torque for the first motor MG1 described above.

Figure 19:
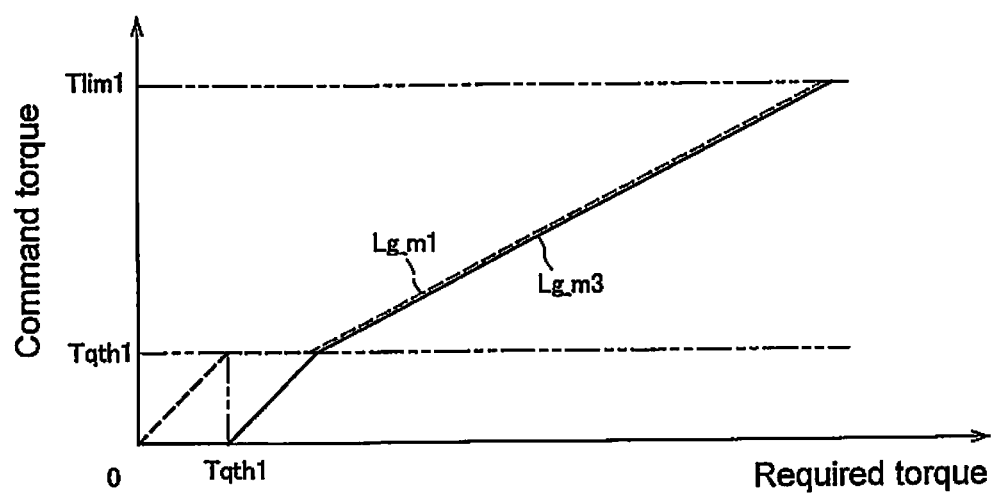
FIG. 19 illustrates distribution of the command torques for the first motor and the third motor according to a second modified example.

FIG. 19 illustrates torque distribution for the third motor MG3 according to a second modified example. FIG. 19 illustrates a command torque for the first motor MG1 and a command torque for the third motor MG3 with respect to the required torque when the third motor MG3 is connected to the first motor MG1. The dashed line Lg_m1 in FIG. 19 depicts the command torque to the first motor MG1 with respect to the required torque. The solid line Lg_m3 depicts the command torque to the third motor MG3 with respect to the required torque.

As illustrated in FIG. 19, when the required torque is equal to or less than a predetermined torque threshold Tqth1, the motor command determining unit 83 determines the required torque as the command torque for the first motor MG1 and sets the command torque for the third motor MG3 to the predetermined standby command value (zero in the present modified example). When the required torque is greater than the predetermined torque threshold Tqth1 and the command torque of the third motor MG3 is equal to or less than the torque threshold Tqth1, the torque threshold Tqth1 is determined as the command torque for the first motor MG1 and the difference between the required torque and the torque threshold Tqth1 is determined as the command torque of the third motor MG3. When the required torque is greater than the predetermined torque threshold Tqth1 and the command torque of the third motor MG3 is greater than the torque threshold Tqth1, the command torques for the first motor MG. 1 and the third motor MG3 are determined so that the command torque of the first motor MG1 and the command torque of the third motor MG3 are the same. In this case, the command torque Tm1 for the first motor MG1 and the command torque Tm3 for the third motor MG3 are expressed as in the following equation 5.

When $Tm1\_ref \leq Tlim1$:

$Tm1 = Tm1\_ref$ $Tm3 = 0$

When $Tlim1 < Tm1\_ref \leq Tlim1*(l+r)$:

$Tm1 = Tlim1$ $Tm3 = (Tm1\_ref - Tlim1)/r$

When $Tlim1*(1+r) < Tm1\_ref$:

$Tm1 = Tm3 = Tm1\_ref/(1+r)$      Equation 5

When the required torque is equal to or less than the predetermined torque threshold Tqth1 in the torque distribution method for the third motor MG3 according to the second modified example, the generation of shock can be suppressed even when the connection with the third motor MG3 is switched because the command torque of the third motor MG3 is the predetermined standby command value. When the required torque is greater than the torque threshold Tqth1 and the command torque of the third motor MG3 is equal to or less than the torque threshold Tqth1, the first motor MG1 can be assisted by the third motor MG3. When the required torque is greater than the predetermined torque threshold Tqth1 and the command torque of the third motor MG3 is greater than the torque threshold Tqth1, the torque assisted by the third motor MG3 increases because the third motor MG3 outputs a torque that is the same size as the first motor MG1. As a result, the output torque of the first motor MG1 can be reduced and wear on the components for transmitting the output torque of the first motor MG1 in the power transmission device 24 can be suppressed. When the third motor MG3 is connected to the second motor MG2, the command torque for the second motor MG2 is determined in the same way as the command torque for the first motor MG1 described above.

The method for determining the second connection determination condition may be changed without being limited to the method for determination of the above exemplary embodiment. For example, when rm1 is equal to or greater than Rm1$th$ (rm1≥Rm1$th$), the connection determining unit 91 may determine that the second connection determination condition with regard to the first motor MG1 is met. Thus, rm1=(Tm1_ref/Tm1_limit). Similarly, when rm2 is equal to or greater than Rm1$th$ (rm2≥Rm2$th$), the connection determining unit 91 may determine that the second connection determination condition with regard to the second motor MG2 is met. When the second connection determination condition with regard to the first motor MG1 and the second connection determination condition with regard to the second motor MG2 are met at the same time, the abovementioned first rotation speed and the second rotation speed are compared and the third motor MG3 may be connected to the motor corresponding to the lowest rotation speed.

For example, Rm1$th$=1. In this case, the required tractive force can be generated. Alternatively, Rm1$th$ may be a value less than one. In this case, the second connection determination condition is met when the required tractive force approaches the limit value. As a result, the required tractive force can be generated more quickly because the synchronization and the connection of the third motor MG3 can be started before the required tractive force reaches the limit value. Alternatively, Rm1$th$ may be a value greater than one. In this case, while the required tractive force may not necessarily be generated, the connection frequency of the third motor MG3 is reduced whereby wear and degradation of the mechanical elements such as gear teeth and electrical elements such as the inverters can be suppressed.

Instead of the above-mentioned method for determining the second disconnection determination condition, when rm1 is less than Rm1$th$ (rm1<Rm1$th$), the connection determining unit 91 may determine that the second disconnection determination condition with regard to the first motor MG1 is met. In this case, Rmth1 of the disconnection determination condition, is preferably equal to or less than the Rm1$th$ of the connection determination condition. More preferably, Rmth1 of the disconnection determination condition is less than the Rm1$th$ of the connection determination condition. In this case, hunting behavior of the switching between the connection and disconnection can be suppressed and the switching can be stabilized because hysteresis is provided between the disconnection determination condition and the connection determination condition.

According to exemplary embodiments of the present invention, a reduction in the size of the motors in a hybrid-type work vehicle is reduced.

What is claimed is:

1. A work vehicle comprising:
   an engine;
   a hydraulic pump driven by the engine;
   a work implement driven by a hydraulic fluid discharged from the hydraulic pump;
   a travel device driven by the engine;
   a power transmission device that transmits driving power from the engine to the travel device; and
   a control unit for controlling the power transmission device;
   the power transmission device including
      an input shaft;
      an output shaft;
      a gear mechanism that has a planetary gear mechanism and that transmits rotation of the input shaft to the output shaft;
      a first motor connected to first rotating elements of the planetary gear mechanism;
      a second motor connected to second rotating elements of the planetary gear mechanism;
      a third motor for assisting the first motor and the second motor; and
      a motor switching mechanism that enables the third motor to be selectively connected to the first motor and the second motor;
      the power transmission device being configured so that a rotation speed ratio of the output shaft with respect to the input shaft is changed by changing the rotation speeds of the first motor, the second motor, and the third motor, and
   the control unit including
      a motor switch control unit that controls the motor switching mechanism so that the third motor is connected to the first motor when a first rotation speed, which is a rotation speed of the first motor corresponding to that of a rotating shaft of the third motor, is less than a second rotation speed, which is a rotation speed of the second motor corresponding to that of a rotating shaft of the third motor; and
      a motor command determining unit that, when the third motor is connected to the first motor, determines a command torque to the first motor and the third motor so that the command torque to the third motor is equal to or less than the command torque to the first motor.

2. The work vehicle according to claim 1, wherein
the motor switching mechanism includes
   a first clutch that switches between connection and disconnection of the third motor with the first motor; and
   a second clutch that switches between connection and disconnection of the third motor with the second motor; and
the control unit further includes a predicted speed computing unit that computes a first predicted rotation speed that is a predicted value of the first rotation speed after a predetermined first predicted time period from a current time has elapsed, and a second predicted rotation speed that is a predicted value of the second rotation speed after the predetermined first predicted time period from a current time has elapsed; and
the motor switch control unit controls the motor switching mechanism to switch a connection target of the third motor from the second motor to the first motor when the first predicted rotation speed is reduced from a value that is larger than the second predicted rotation speed to the second predicted rotation speed.

3. The work vehicle according to claim 2, wherein
from a time point when the first predicted rotation speed reaches the second predicted rotation speed until a predetermined second predicted time period has elapsed, the motor command determining unit sets the command torque for the third motor to a predetermined standby command value.

4. The work vehicle according to claim 1, wherein
when the third motor is connected to the first motor, the motor command determining unit determines the command torques to the first motor and the third motor so that the command torque to the third motor is the same as the command torque to the first motor.

5. The work vehicle according to claim 1, wherein
the motor command determining unit determines a required torque to the first motor;
the motor command determining unit determines the required torque as the command torque to the first motor, and sets the command torque to the third motor to the predetermined standby command value when the third motor is connected to the first motor and the required torque is equal to or less than a predetermined boundary torque; and
the motor command determining unit determines the boundary torque as the command torque to the first motor, and determines the command torque to the third motor from a difference between the required torque and the boundary torque when the third motor is connected to the first motor and the required torque is greater than the boundary torque.

6. The work vehicle according to claim 1, wherein
the motor command determining unit determines a required torque to the first motor;
the motor command determining unit determines the required torque as the command torque to the first motor and sets the command torque to the third motor to the predetermined standby command value when the third motor is connected to the first motor and the required torque is equal to or less than a predetermined torque threshold;
the motor command determining unit determines the torque threshold as the command torque to the first motor and determines the command torque to the third motor from a difference between the required torque and the torque threshold value when the third motor is connected to the first motor, the required torque is greater than the torque threshold and the command torque to the third motor is equal to or less than the torque threshold; and the motor command determining unit determines the command torques to the first motor and the third motor so that the command torque to the third motor is the same as the command torque to the first motor when the third motor is connected to the first motor, the required torque is greater than the torque threshold, and the command torque to the third motor is greater than the torque threshold.

7. The work vehicle according to claim 1, wherein when the second rotation speed is less than the first rotation speed, the motor switch control unit controls the motor switching mechanism to connect the third motor to the second motor, and the motor command determining unit determines the command torques to the second motor and the third motor so that the command torque to the third motor is equal to or less than the command torque to the second motor when the third motor is connected to the second motor.

8. The work vehicle according to claim 2, wherein the motor switch control unit controls the motor switching mechanism to switch the connection target of the third motor from the first motor to the second motor when the second predicted rotation speed is reduced from a value greater than the first predicted rotation speed to the first predicted rotation speed.

9. The work vehicle according to claim 8, wherein from a time point when the second predicted rotation speed reaches the first predicted rotation speed until a predetermined third predicted time period has elapsed, the motor command determining unit sets the command torque for the third motor to a predetermined standby command value.

10. The work vehicle according to claim 7, wherein when the third motor is connected to the second motor, the motor command determining unit determines the command torques to the second motor and the third motor so that the command torque to the third motor is the same as the command torque to the second motor.

11. The work vehicle according to claim 7, wherein the motor command determining unit determines a required torque to the second motor;

the motor command determining unit determines the required torque as the command torque to the second motor and sets the command torque to the third motor to the predetermined standby command value when the third motor is connected to the second motor and the required torque is equal to or less than a predetermined boundary torque; and the motor command determining unit determines the boundary torque as the command torque to the second motor, and determines the command torque to the third motor from a difference between the required torque and the boundary torque when the third motor is connected to the second motor and the required torque is greater than the boundary torque.

12. The work vehicle according to claim 7, wherein the motor command determining unit determines a required torque to the second motor;

the motor command determining unit determines the required torque as the command torque to the second motor and sets the command torque to the third motor to the predetermined standby command value when the third motor is connected to the second motor and the required torque is equal to or less than a predetermined torque threshold;

the motor command determining unit determines the torque threshold as the command torque to the second motor and determines the command torque to the third motor from a difference between the required torque and the torque threshold value when the third motor is connected to the second motor, the required torque is greater than the torque threshold and the command torque to the third motor is equal to or less than the torque threshold; and the motor command determining unit determines the command torques to the second motor and the third motor so that the command torque to the third motor is the same as the command torque to the second motor when the third motor is connected to the second motor, the required torque is greater than the torque threshold, and the command torque to the third motor is greater than the torque threshold.

13. The work vehicle according to claim 1, wherein the rotation speed of the first motor is less than the first rotation speed.

14. The work vehicle according to claim 7, wherein the rotation speed of the second motor is less than the second rotation speed.

15. The work vehicle according to claim 1, wherein the motor switching mechanism includes
   a first clutch that switches between connection and disconnection of the third motor with the first motor; and
   a second clutch that switches between connection and disconnection of the third motor with the second motor; and the control unit further includes a predicted speed computing unit that computes a first predicted rotation speed that is a predicted value of the first rotation speed after a predetermined first predicted time period from a current time has elapsed, and a second predicted rotation speed that is a predicted value of the second rotation speed after the predetermined first predicted time period from a current time has elapsed;

the motor switch control unit controls the motor switching mechanism to switch a connection target of the third motor from the second motor to the first motor when the first predicted rotation speed is reduced from a value that is larger than the second predicted rotation speed to the second predicted rotation speed;

from a time point when the first predicted rotation speed reaches the second predicted rotation speed until a predetermined second predicted time period has elapsed, the motor command determining unit sets the command torque for the third motor to a predetermined standby command value;

when the third motor is connected to the first motor, the motor command determining unit determines the command torques to the first motor and the third motor so that the command torque to the third motor is the same as the command torque to the first motor;

the motor switch control unit controls the motor switching mechanism to switch the connection target of the third motor from the first motor to the second motor when the second predicted rotation speed is reduced from a value greater than the first predicted rotation speed to the first predicted rotation speed;

from a time point when the second predicted rotation speed reaches the first predicted rotation speed until a predetermined third predicted time period has elapsed, the motor command determining unit sets the command torque for the third motor to a predetermined standby command value; and when the third motor is connected to the second motor, the motor command determining unit determines the command torques to the second motor and the third motor so that the command torque to the third motor is the same as the command torque to the second motor.

16. A control method for a work vehicle, comprising:
an engine;
a hydraulic pump driven by the engine;
a work implement driven by a hydraulic fluid discharged from the hydraulic pump;
a travel device driven by the engine;
a power transmission device that transmits driving power from the engine to the travel device;
the power transmission device including
  an input shaft;
  an output shaft;
  a gear mechanism that has a planetary gear mechanism and that transmits rotation of the input shaft to the output shaft;
  a first motor connected to first rotating elements of the planetary gear mechanism;
  a second motor connected to second rotating elements of the planetary gear mechanism;
  a third motor for assisting the first motor and the second motor; and
  a motor switching mechanism that enables the third motor to be selectively connected to the first motor and the second motor; and
  the power transmission device being configured so that a rotation speed ratio of the output shaft with respect to the input shaft is changed by changing the rotation speeds of the first motor, the second motor, and the third motor; and
the method comprising
controlling the motor switching mechanism so that the third motor is connected to the first motor when a first rotation speed, which is a rotation speed of the first motor corresponding to that of a rotating shaft of the third motor, is less than a second rotation speed, which is a rotation speed of the second motor corresponding to that of a rotating shaft of the third motor; and
when the third motor is connected to the first motor, determining command torques to the first motor and the third motor so that the command torque to the third motor is equal to or less than the command torque to the first motor.

* * * * *